(12) United States Patent
Miyazaki

(10) Patent No.: US 9,602,857 B2
(45) Date of Patent: Mar. 21, 2017

(54) INFORMATION PROCESSING APPARATUS, INFORMATION PROCESSING METHOD AND PROGRAM

(75) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 430 days.

(21) Appl. No.: 13/547,010

(22) Filed: Jul. 11, 2012

(65) Prior Publication Data

US 2013/0031206 A1 Jan. 31, 2013

(30) Foreign Application Priority Data

Jul. 27, 2011 (JP) .................................. 2011-164318

(51) Int. Cl.
*G06F 15/16* (2006.01)
*H04N 21/414* (2011.01)
*H04N 21/482* (2011.01)
*H04N 21/61* (2011.01)
*H04N 21/84* (2011.01)

(52) U.S. Cl.
CPC ..... *H04N 21/41407* (2013.01); *H04N 21/482* (2013.01); *H04N 21/4825* (2013.01); *H04N 21/4826* (2013.01); *H04N 21/6125* (2013.01); *H04N 21/84* (2013.01)

(58) Field of Classification Search
None
See application file for complete search history.

(56) References Cited

U.S. PATENT DOCUMENTS

| 7,017,120 | B2 * | 3/2006 | Shnier | 715/783 |
| 2002/0038359 | A1 * | 3/2002 | Ihara et al. | 709/219 |
| 2004/0111747 | A1 * | 6/2004 | Omoigui | 725/58 |
| 2006/0059535 | A1 * | 3/2006 | D'Avello | 725/139 |
| 2006/0217198 | A1 * | 9/2006 | Johnson | 463/40 |
| 2008/0313195 | A1 * | 12/2008 | DeShan et al. | 707/10 |

FOREIGN PATENT DOCUMENTS

JP 2011-108146 6/2011

* cited by examiner

*Primary Examiner* — Mohamed Ibrahim
(74) *Attorney, Agent, or Firm* — Paratus Law Group, PLLC

(57) ABSTRACT

There is provided an information processing apparatus which includes: a live content registration processing section that registers live content which is preset with play time and the playing time of the live content in a play list while connecting the play time to the live content; and an archive content registration processing section that registers archive content and the play time of the archive content in the play list after determining a period of time earlier than the play time of the live content as the play time of the archive content which is playable at given time.

16 Claims, 18 Drawing Sheets

INFORMATION PROCESSING APPARATUS, INFORMATION PROCESSING METHOD AND PROGRAM

BACKGROUND

The present disclosure relates to an information processing apparatus, an information processing method and a program.

In an Internet technology taught in, for example, Japanese Unexamined Patent Application Publication No 2011-108146, it is configured to deliver live content. The live content herein means content in which the play time; i.e. play start time and play termination time are preset. That is, a server providing live content starts delivery of live content at the time to start playing the live content, and terminates the delivery of the live content at the play termination time of the live content.

SUMMARY

However, since the play time of the live content is preset, a user may forget to use (viewing and listening and the like) of the live content. Therefore, there is desired a technology which is capable of reliably recommending the use of the live content to the user.

The present disclosure provides an information processing apparatus which includes: a live content registration processing section that registers live content which is preset with play time and the playing time of the live content in a play list while connecting the play time to the live content; and an archive content registration processing section that registers archive content and the play time of the archive content in the play list after determining a period of time earlier than the play time of the live content as the play time of the archive content which is playable at given time.

The present disclosure provides an information processing method which includes: registering live content which is preset with play time and the playing time of the live content in a play list while connecting the play time to the live content; and registering archive content and the play time of the archive content in the play list after determining a period of time earlier than the play time of the live content as the play time of the archive content which is playable at given time.

The present disclosure provides a program causing a computer to execute: a live content registration processing function to register live content which is preset with play time and the playing time of the live content in a play list while connecting the play time to the live content; and an archive content registration processing function to register archive content and the play time of the archive content in the play list after determining a period of time earlier than the play time of the live content as the play time of the archive content which is playable at given time.

According to the present disclosure, since archive content can be played before playing the live content, it is possible to prompt the user to a fact that the live content is registered.

As described above, according to the present disclosure, since it is possible to notify the user of a fact that the live content is registered, the user is reliably encouraged to use the live content.

DETAILED DESCRIPTION OF THE EMBODIMENTS

Figure 1:
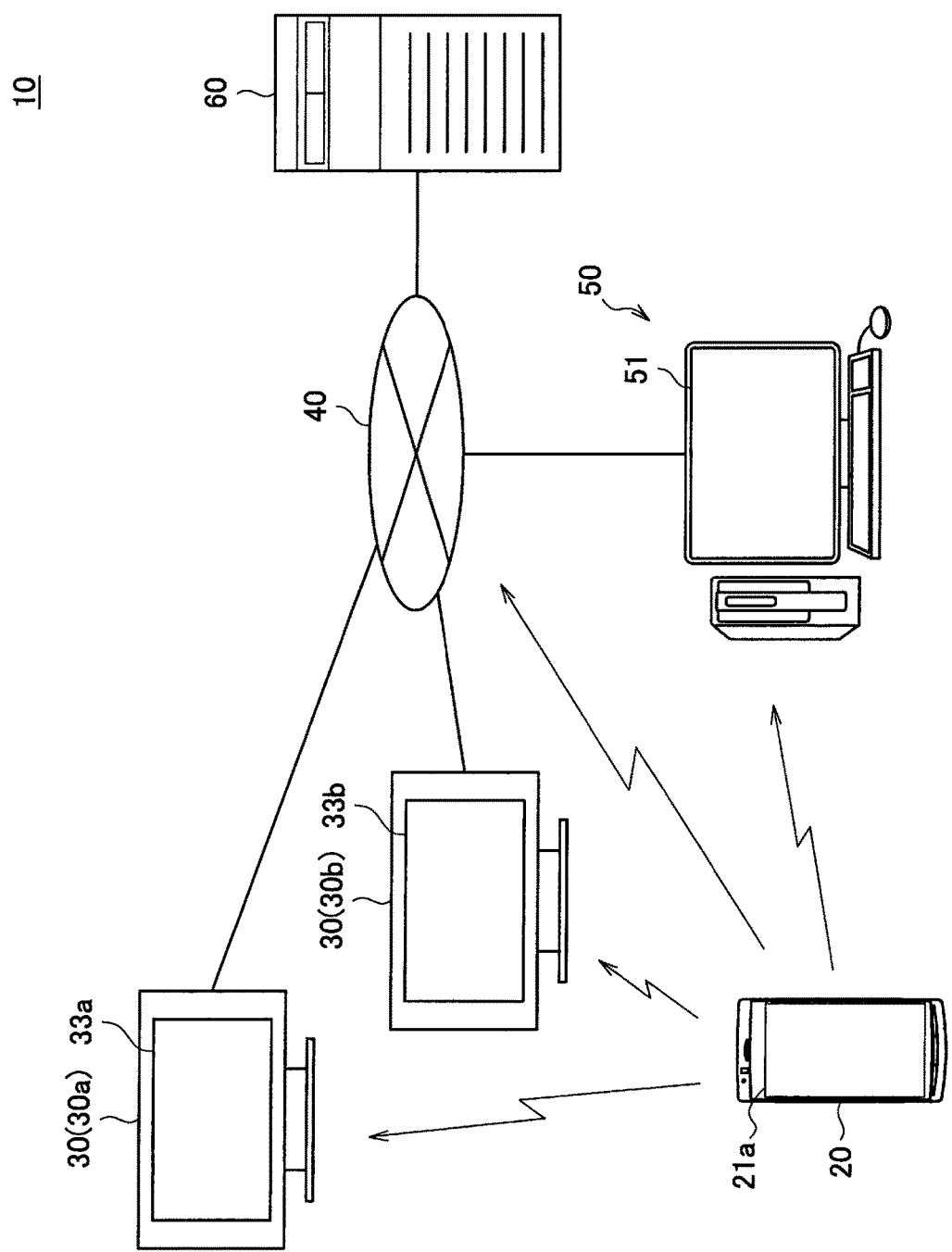
FIG. 1 is an illustration showing an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be made in the following order.
1. Entire configuration
2. Configuration of communication apparatus
3. Configuration of presentation control apparatus
4. Processing sequence by information processing system
<1. Entire Configuration>

Referring to FIG. 1, an entire configuration of an information processing system 10 according to an embodiment of the present disclosure will be described first. The information processing system 10 includes a communication apparatus (information processing apparatus) 20, a presentation control apparatus 30, a communication network 40, a personal computer (PC) 50 and a server 60.

The communication apparatus 20 is a mobile device which is potable by a user, and is capable of performing wireless communication with the presentation control apparatus 30 and the PC 50. Hereinafter, if not otherwise specified, the word "user" means a user of the communication apparatus 20.

Also, the communication apparatus 20 is capable of being connected to the communication network 40. The communication network 40 is connected to the presentation control apparatus 30, the PC 50 and the server 60. Accordingly, the communication apparatus 20 is capable of performing communication with these apparatuses via the communication network 40.

The communication apparatus 20 is capable of obtaining various types of content from the server 60 via the communication network 40, and is capable of presenting the obtained content. That is, the communication apparatus 20 displays image content on a display area (display screen) 21a, and outputting sound content (music content or the like) from a speaker (not shown).

As for the communication apparatus 20, any apparatus which is capable of being connected to the communication network 40 and is capable of presenting various types of content may be applicable; for example, a desktop PC, a notebook computer and a game machine are available.

The presentation control apparatus 30 presents various types of content. That is, the presentation control apparatus 30 displays image content or the like on a display screen 33a, and outputs sound content through a speaker (not shown). Also, the presentation control apparatus 30 performs wireless communication with the communication apparatus 20. Also, the presentation control apparatus 30 is connected to the communication network 40, and is capable of performing communication with the communication apparatus 20, the PC 50 and the server 60 via the communication network 40.

The PC 50 is so-called a desktop PC, and is capable of performing communication with the communication apparatus 20, the presentation control apparatus 30 and the server 60 via the communication network 40. The PC 50 is capable of presenting obtained content through the communication. That is, the PC 50 displays image content on a display area 51, and outputs sound content through a speaker (not shown).

The server 60 provides (delivery, transmission) various types of content to the communication apparatus 20, the presentation control apparatus 30 and the PC 50 via the communication network 40.

Any kind of content may be provided by the server 60. The content provided by the server 60 includes, for example, content of motion pictures, content of still pictures and sound content (music content or the like). The content of motion pictures may include, for example, various TV programs, movies, motion pictures of lessons recorded at various educational institutions and the like.

Each content according to the embodiment includes meta-information of the content. The meta-information of content is a piece of information on the content. For example, a piece of meta-information of content of a motion picture includes a piece of address information representing presence of the content of the motion picture, a title (including program title) of the content of the motion picture, category, a thumbnail, and reproduction time thereof. Here, the category of content of motion picture is an item representing category like drama, news, sports and the like. The reproduction time of content of a motion picture means a period of time for reproducing of the content of the motion picture.

The meta-information of content of a motion picture includes character name, cast, director's name, staff, story, author's name, user's profile, user's usage history and the like. Here, the user's profile is a piece of statistically processed information on generation, sex, occupation, user's tendency to the content (category of content frequently used) and the like. The user's usage history is a piece of content-based information representing user's usage history. The user's usage history may be stored in the communication apparatus 20.

Meta-information of sound content includes a piece of address information representing a presence of the sound content, title of the sound content (music name), reproduction time, artist's name, user's profile, user's usage history and the like.

The server 60 provides content of motion pictures and sound content in a format of live content or archive content. The word "live content" herein means content in which the play time; i.e. play start time and play termination time are preset. In addition to the above information, the meta-information of live content includes play start time and play termination time. The archive content means content which is playable at any time. The server 60 provides content of motion picture and sound content in a format of streaming. In this embodiment, the "play time" means a period of time from a point of the play start time to a point of the play termination time.

The communication network 40 is a communication channel among the communication apparatus 20, the presentation control apparatus 30, the PC 50, and the server 60. The communication network 40 may be the Internet or a local network like a home network or office network.

In FIG. 1, the information processing system 10 according to an embodiment of the present disclosure includes one communication apparatus 20, two presentation control apparatuses 30, one PC 50 and one server. However, the number of constituent elements is not particularly limited to the above example.

<2. Configuration of Communication Apparatus>

Figure 2:
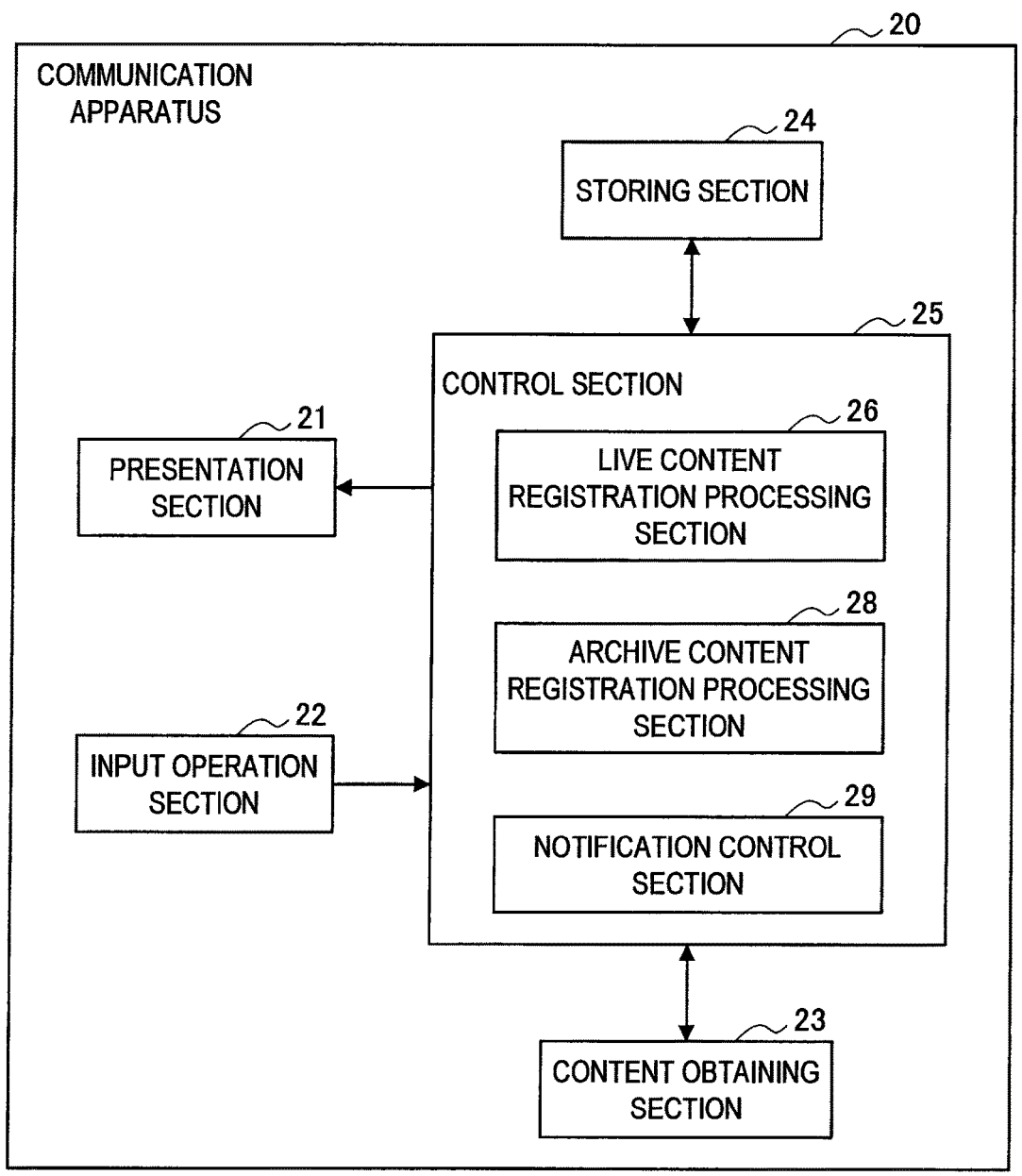
FIG. 2 is a block diagram showing a configuration of a communication apparatus according to the embodiment.

Subsequently, referring to FIG. 1 and FIG. 2, a configuration of the communication apparatus 20 will be described. As shown in FIG. 2, the communication apparatus 20 includes a presentation section 21, an input operation section 22, a content obtaining section 23, a storing section 24 and a control section 25. That is, the communication apparatus 20 has a hardware configuration including a CPU, a ROM, a RAM, a touch panel, a display, a communication antenna and the like; and the these constituent elements constitute the hardware configuration.

The presentation section 21 is so-called a display including the display area 21a. The presentation section 21 displays various kinds of image content and the like on the display area 21a, and outputs various kinds of sound content through a speaker (not shown). The input operation section 22 is so-called a touch panel that outputs operation information to the control section 25 corresponding to user's input operation.

The content obtaining section 23 is connected to the server 60 via the communication network 40 to obtain various types of content. Also, the content obtaining section 23 performs wireless communication with the presentation control apparatus 30 and the PC 50.

The storing section 24 stores various kinds of information necessary for the communication apparatus 20 to execute various kinds of processing including; for example, image information, sound information, play list, program and the like. The play list is classified into a motion picture play list and a music play list.

Figure 9:
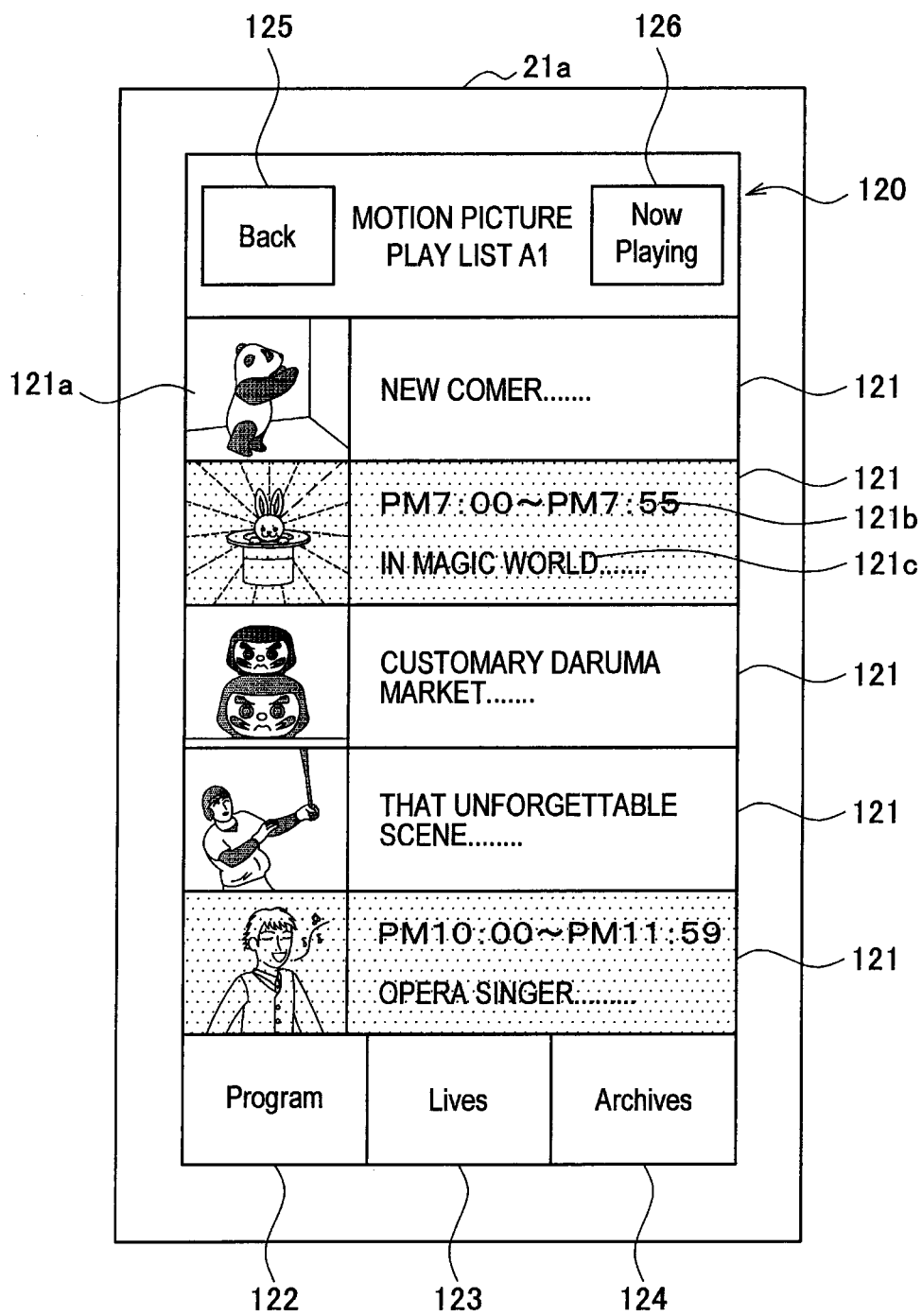
FIG. 9 is an illustration showing an example of an image displayed on the display screen of the communication apparatus.

The motion picture play list generally includes content of motion pictures and play time of each content of motion pictures which are registered in association with each other. FIG. 9 shows a display area 21a on which a motion picture play list 120 is displayed as an example of the motion picture play list. The motion picture play list 120 includes a plurality of buttons of registered information 121, an auto program button 122, a live content button 123, an archive content button 124, a back button 125 and a play button 126. In FIG. 9, the name of the motion picture play list 120 is indicated as "Motion picture play list A1". The time frame registrable in the motion picture play list is, for example, from 0:00 of the day including the current time through 23:59.

The registered information 121 is a piece of information including a thumbnail 121a of content of the motion picture, a piece of play time information 121b indicating play time of the content of the motion picture, and an explanation text content 121c explaining outline of the content of the motion picture, which are associated with each other. When the content of the motion picture is archive content, generally the play time information 121b is not included in the registered information 121; but the play time information 121b may be included therein.

The outline of the content of a motion picture may include, for example, a title of the content of the motion picture, characters' names, director's name, outline, author's name and the like. In the plural pieces of the registered information 121, items which are the live content are marked with a shade. With this, the user easily determines which registered information 121 is the live content. The plural pieces of registered information 121 are aligned in a descending order of the play time; i.e., a piece of registered information 121 which has earlier play time comes first.

The auto program button 122 is a button for activating an auto program function, which will be described below; i.e. for displaying registered information 121 which is registered in the play list through an archive content registration processing. That is, when the user presses the auto program button 122, in the plural pieces of registered information 121, only the pieces of registered information 121 which are registered in the play list by the auto program function are displayed in the display area 21a.

The live content button 123 is a button for displaying registered information 121 corresponding to the live content. That is, when the user presses the live content button 123, in the plural pieces of registered information 121, only the pieces of registered information 121 corresponding to the pieces of live content are displayed on the display area 21a.

The archive content button 124 is a button for displaying registered information 121 corresponding to the archive content. That is, when the user presses the archive content button 124, in the plural pieces of registered information 121, only the pieces of registered information 121 corresponding to the pieces of archive content are displayed on the display area 21a.

The back button 125 is a button for displaying a previous image by one step in the motion picture play list 120. The play button 126 is a button for playing content of motion picture which is presently playable.

The music play list generally includes music content and play time of each of the music content, which are registered being associated with each other. Same as the motion picture play list, the music play list includes plural pieces of registered information. The registered information is a piece of information including play time of the music content and an explanation text explaining an outline of the music content.

A program stored in the storing section 24 is a program for causing the communication apparatus 20 to function each of function blocks; particularly, a live content registration processing section 26, an archive content registration processing section 28 and a notification control section 29.

The control section 25 controls the respective constituent elements of the communication apparatus 20. The control section 25 also functions as the live content registration processing section 26, the archive content registration processing section 28 and the notification control section 29.

<3. Configuration of the Presentation Control Apparatus>

Figure 3:
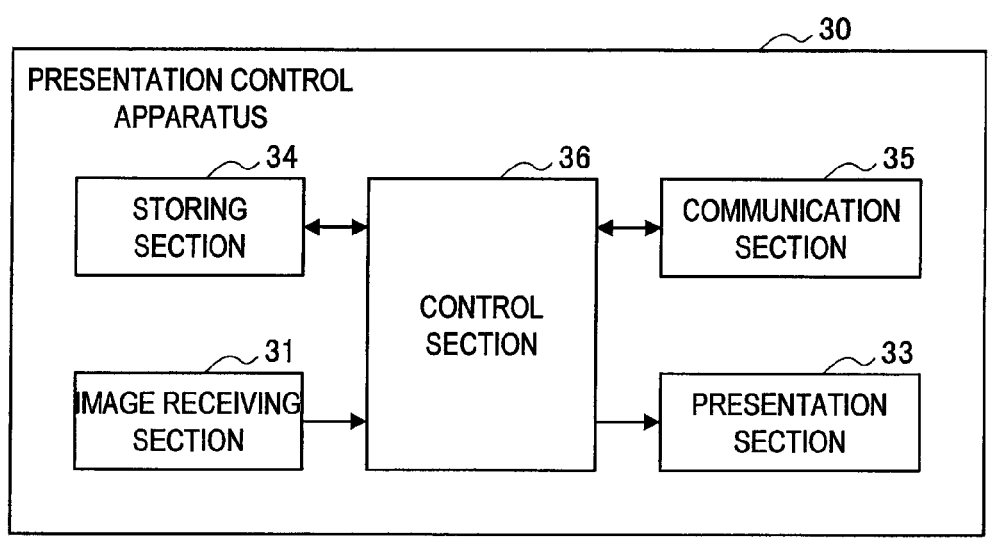
FIG. 3 is a block diagram showing a configuration of a presentation control apparatus according to the embodiment.

Subsequently, a configuration of the presentation control apparatus 30 will be described referring to FIG. 1 and FIG. 3. The presentation control apparatus 30 includes an image receiving section 31, a presentation section 33, a storing section 34, a communication section 35 and a control section 36. That is, the presentation control apparatus 30 has a hardware configuration including a CPU, a ROM, a RAM, a hard disk, a display, a communication antenna and the like; and these constituent elements constitute the hardware configuration.

The image receiving section 31 receives airwaves which include various kinds of image content and sound content, and extracts desired content from the received airwaves. Each content included in the airwaves includes its own meta-information of the content. The image receiving section 31 outputs extracted content to the control section 36.

The presentation section 33 is so-called a display, which includes the display area (display screen) 33a. The presentation section 33 presents various types of content. That is, the presentation section 33 displays image content on the display area 33a and outputs sound content through the speaker (not shown).

The storing section 34 stores various kinds of information, for example, various kinds of image information, sound information, programs and the like, which are necessary for the presentation control apparatus 30 for performing the processing.

The communication section 35 performs wireless communication with the communication apparatus 20, and performs communication with the communication apparatus 20, the PC 50, and the server 60 via the communication network 40. The communication section 35 outputs the content, which is obtained through the communication, to the control section 36. The control section 36 controls the respective constituent elements of the presentation control apparatus 30. The control section 36 also causes the presentation section 33 to present the content given by the image receiving section 31 and the communication section 35.

<4. Processing Sequence by the Information Processing System>

Figure 7:
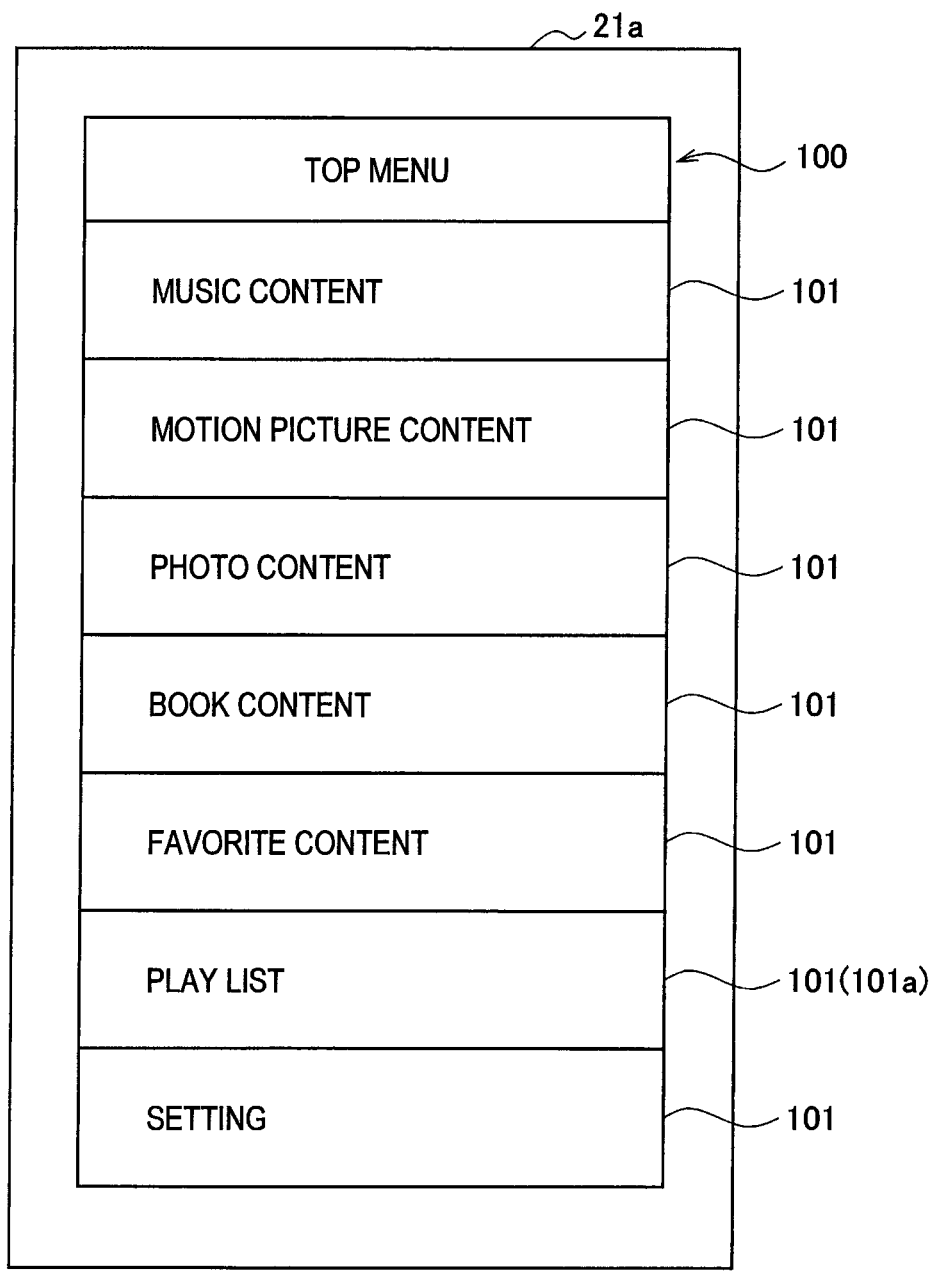
FIG. 7 is an illustration showing an example of an image displayed on a display screen of a communication apparatus.

Subsequently, a processing sequence performed by the information processing system will be described; mainly on the processing performed by the communication apparatus 20. A description on a method how the user makes a reference to various kinds of play lists will be made first. The control section 25 displays a top menu image 100 shown in FIG. 7 on the display area 21a at given timing.

The top menu image 100 includes a plurality of item selection buttons 101. Each of the item selection buttons 101 indicates content and the like, which are displayed when the item selection button 101 is pressed. The user taps (touch) an item selection button 101a indicated as "Play list". The input operation section 22 outputs a piece of operation information corresponding to the tap operation to the control section 25.

Figure 8:
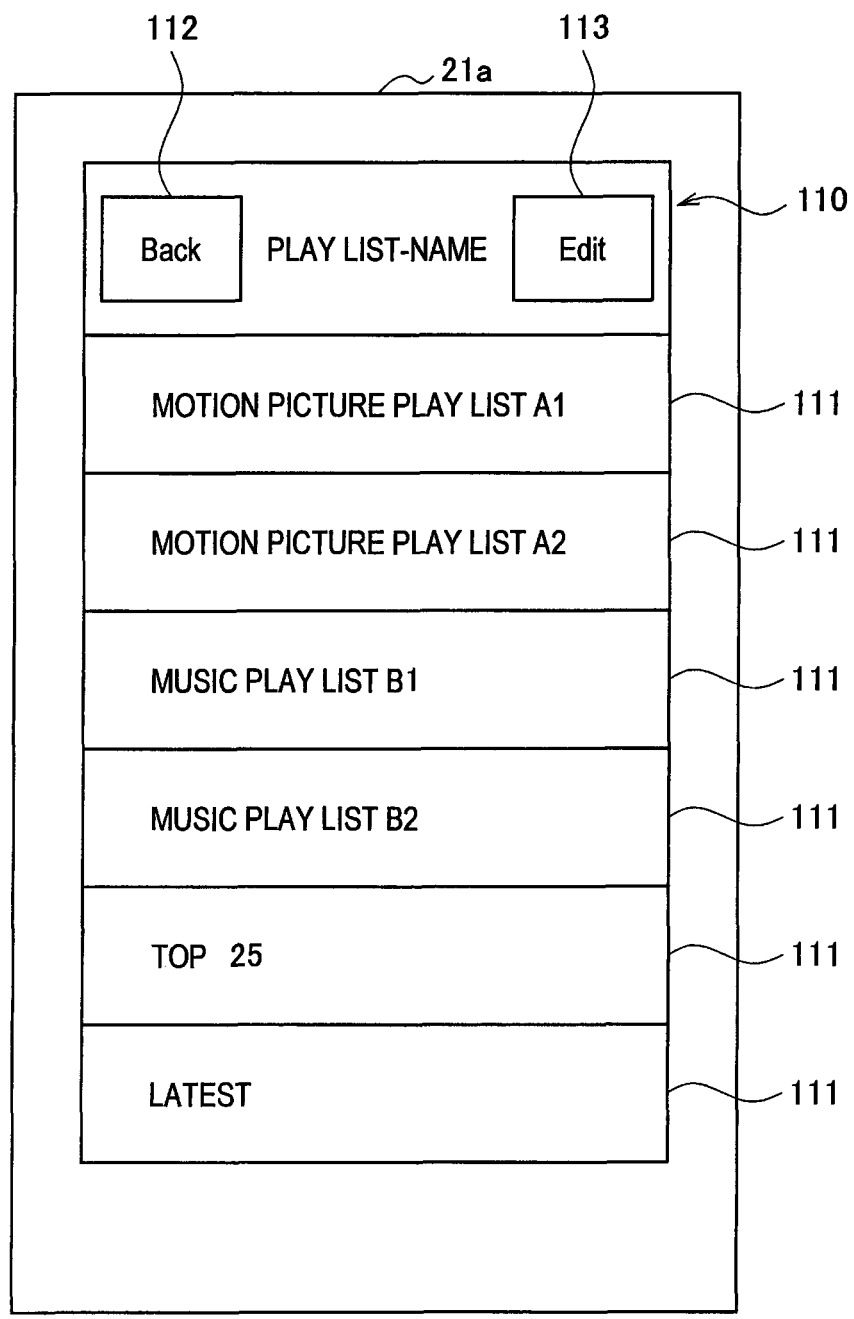
FIG. 8 is an illustration showing an example of an image displayed on the display screen of the communication apparatus.

The control section 25 displays a play list-name image 110 shown in FIG. 8 on the display area 21a based on the operation information. The play list-name image 110 includes a plurality of item selection buttons 111, a back button 112 and an edit button 113. Each of the item selection buttons 111 displays a play list and the like which is displayed when the item selection button 111 is pressed. The back button 112 is a button for returning the image displayed on the display area 21a to the top menu image 100. The edit button 113 is a button for editing the play list-name image 110 and the like.

The user taps an item selection button 111 on which a desired play list is indicated. The input operation section 22 outputs a piece of operation information corresponding to the tap operation to the control section 25. The control section 25 displays a play list selected by the user on the display area 21a based on the operation information. For example, when the user taps an item selection button 111 indicated as "Motion picture play list A1", the control section 25 displays a motion picture play list 120 shown in FIG. 9 on the display area 21a.

[Live Content Registration Processing]

The communication apparatus 20 performs, in addition to the above-described processing, live content registration processing, archive content registration processing and content play processing. The communication apparatus 20 performs the live content registration processing to register the live content to the motion picture play list. The communication apparatus 20 performs archive content registration processing to register the archive content to the motion picture play list. The communication apparatus 20 performs content play processing to issue an alert before playing the live content, and plays the content.

Figure 4:
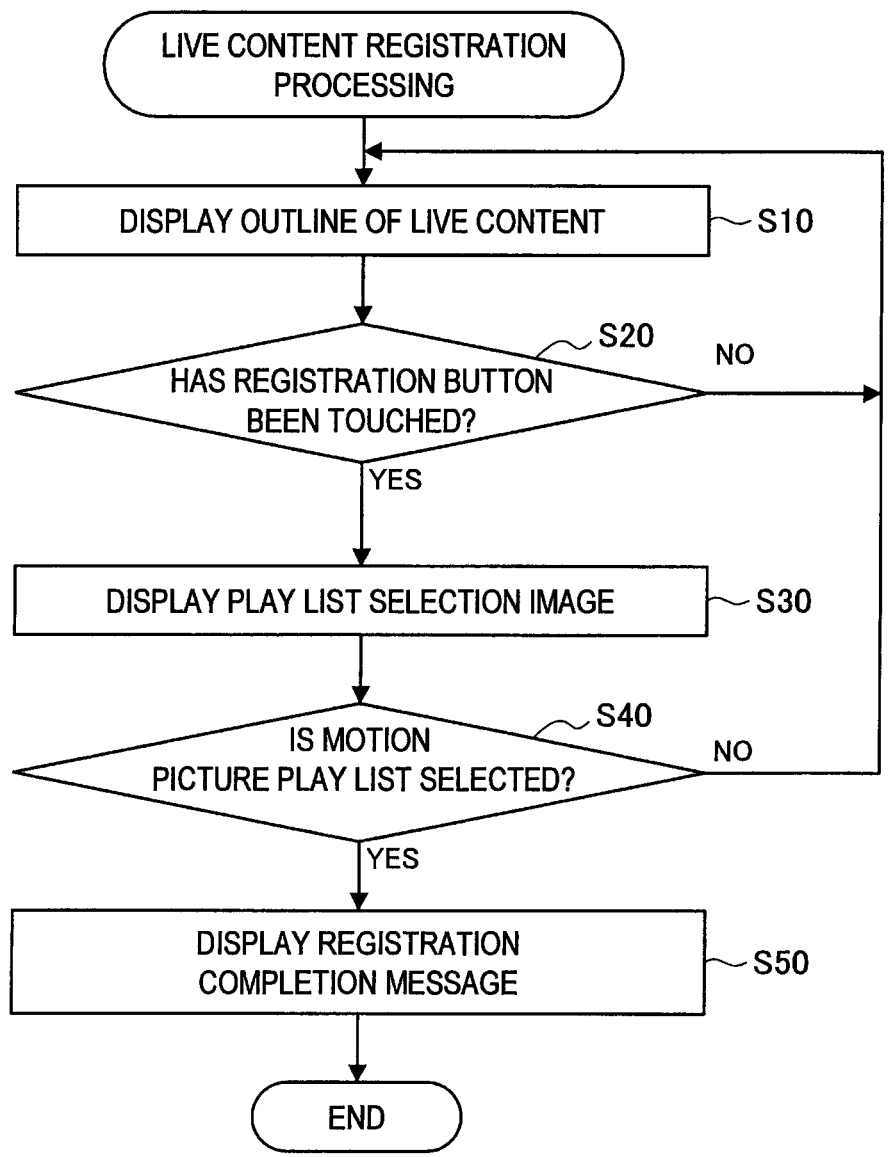
FIG. 4 is a flow chart showing a processing sequence by the information processing system.

Referring to FIG. 4, the live content registration processing will be described first. In the description below, the communication apparatus 20 registers content of motion picture to the motion picture play list and performs the content; the communication apparatus 20 also performs similar processing on the music content.

In step S10, the communication apparatus 20 picks up live content from the server 60. In particular, the content obtaining section 23 of the communication apparatus 20 accesses the server 60 to obtain meta-information on one or each of plural pieces of live content. The content obtaining section 23 outputs the obtained meta-information to the live content registration processing section 26. The live content registration processing section 26 stores the meta-information in the storing section 24.

Here, the live content of the meta-information to be obtained may be either selected by the content obtaining section 23, or may be selected by the user. When the user selects the live content, for example, the content obtaining section 23 accesses the server 60 to obtain a home page in which plural pieces of meta-information of live content are displayed in a list. The live content registration processing section 26 displays the home page on the display area 21a. The user makes a reference to the home page displayed on the display area 21a to select desired live content. For example, the user taps a portion where desired live content is indicated in the home page. The input operation section 22 outputs a piece of operation information corresponding to the tap operation to the live content registration processing section 26. The live content registration processing section 26 recognizes the live content selected by the user based on the operation information, and stores a piece of meta-information corresponding to the recognized live content in the storing section 24.

The live content registration processing section 26 obtains the meta-information on any one of the plural pieces of live content from the plural pieces meta-information stored in the storing section 24, and generates a live content outline display image based on the obtained meta-information. The live content registration processing section 26 displays the live content outline display image on the display area 21a.

Figure 10:
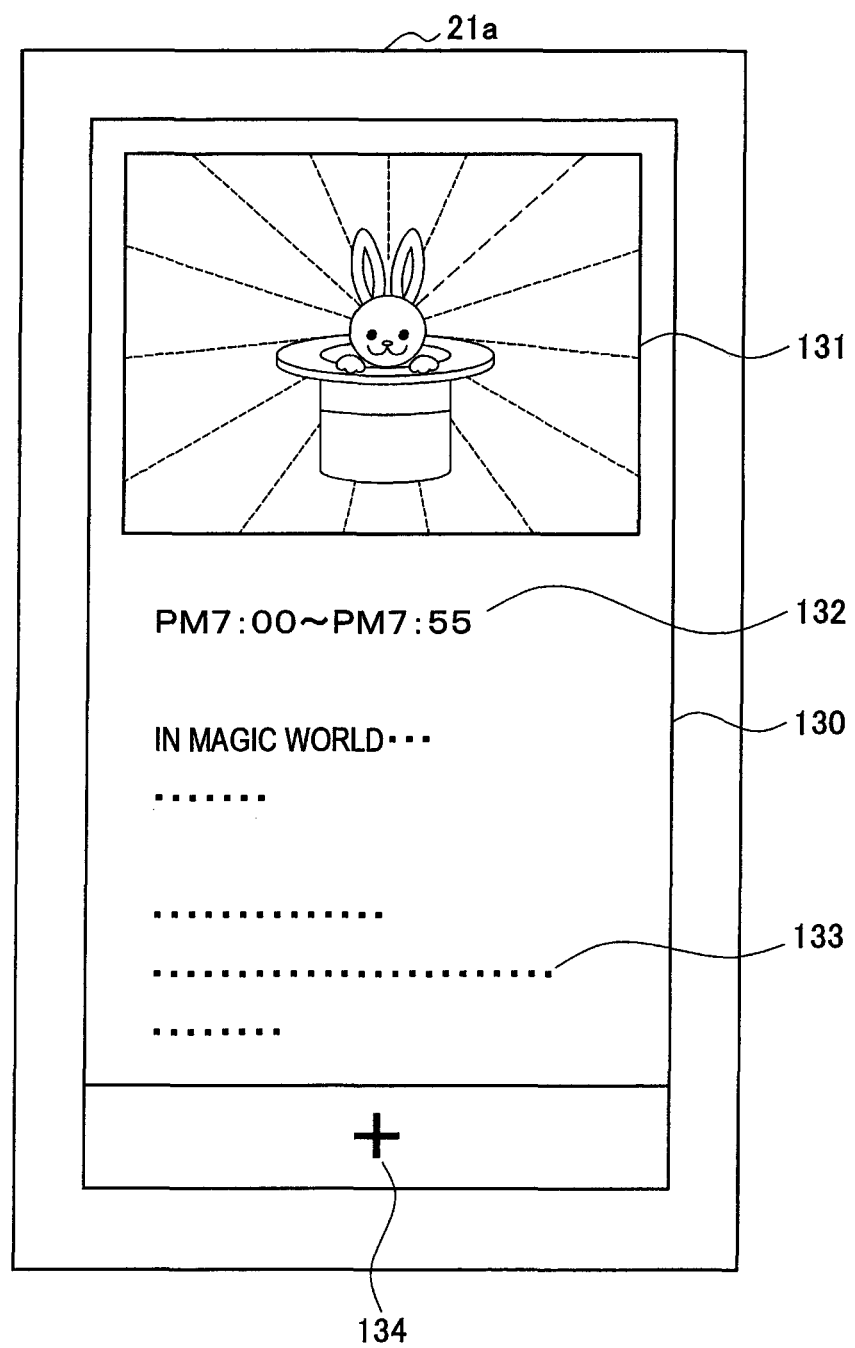
FIG. 10 is an illustration showing an example of an image displayed on the display screen of the communication apparatus.

FIG. 10 illustrates a live content outline display image 130 as an example of the live content outline display image. The live content outline display image 130 includes a thumbnail 131 of the live content, a piece of play time information 132 indicating the play time of the live content, an explanation text content 133 explaining the outline of the live content, and a registration button 134. The registration button 134 is a button for allowing the user to add the live content in the play list.

In step S20, the live content registration processing section 26 determines if the user has tapped the registration button based on the operation information given from the input operation section 22. When it is determined that the user has tapped the registration button, the live content registration processing section 26 proceeds to step S30; and when it is determined that the user has not tapped the registration button, the live content registration processing section 26 returns to step S10. When returning to step S10, the live content registration processing section 26 switches the live content outline display image to be displayed on the display area 21a. The live content registration processing section 26 may switch the live content outline display image at given timing, or may switch the image when a switching instruction is given by the user.

On the other hand, the user makes a reference to the live content outline display image to determine if the live content should be registered to the motion picture play list. When the user determines to register the live content to the motion picture play list, the user taps the registration button 134. The input operation section 22 outputs a piece of operation information corresponding to the tap operation to the live content registration processing section 26.

Figure 11:
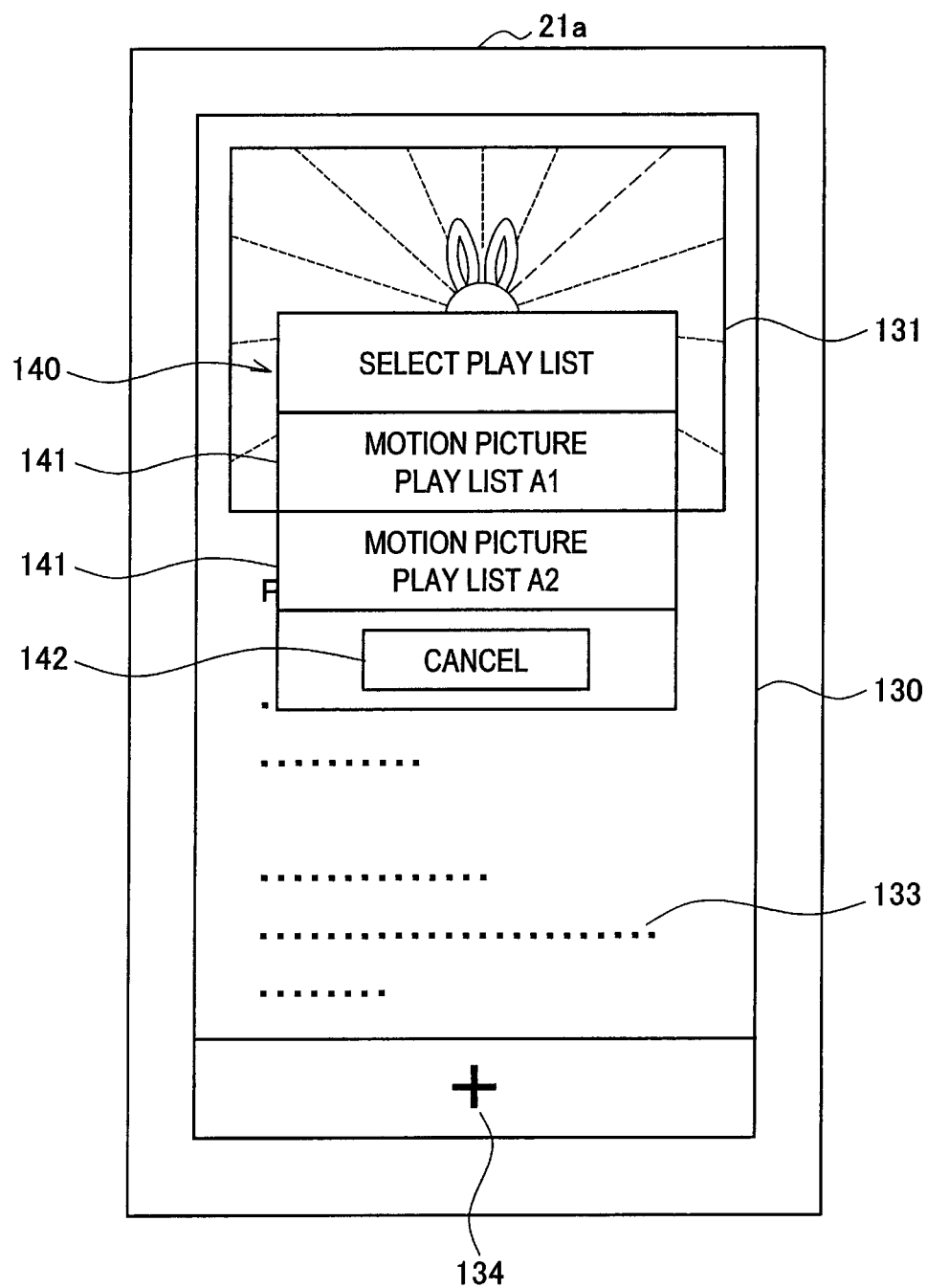
FIG. 11 is an illustration showing an example of an image displayed on the display screen of the communication apparatus.

In step S30, the live content registration processing section 26 displays a play list selection image on the display area 21a. FIG. 11 illustrates a play list selection image 140 as an example of the play list selection image. The play list selection image 140 includes a plurality of item selection buttons 141 and a cancel button 142. The item selection button 141 is a button for allowing the user to select a motion picture play list, on which a play list name is displayed. The cancel button 142 is a button for allowing the user to cancel the registration of the live content.

In step S40, the live content registration processing section 26 determines if any motion picture play list is selected based on the operation information given from the input operation section 22. When it is determined any of the motion picture play lists is selected, the live content registration processing section 26 proceeds to step S50. Contrarily, when it is determined any of the motion picture play lists is not selected; i.e. when it is determined that the cancel button 142 is tapped, the live content registration processing section 26 returns to step S10.

On the other hand, the user makes a reference to the play list selection image, and determines a play list to which the live content should be registered, and taps the item selection button 141 corresponding to the determined play list. When cancelling the registration of the live content, the user taps the cancel button 142. The input operation section 22 outputs operation information corresponding to the tap operation to the live content registration processing section 26.

In step S50, the live content registration processing section 26 identifies the play list selected by the user based on the operation information. The live content registration processing section 26 registers the live content and the play time of the live content to the identified play list while connecting to each other. In particular, the live content registration processing section 26 generates the above registered information based on the meta-information of live content and stores the same in the play list. Here, the registered information is a piece of information including a thumbnail of the live content, a piece of play time information representing the play time of the live content, and an explanation text content explaining an outline of the live content, which are associate with each other.

Figure 12:
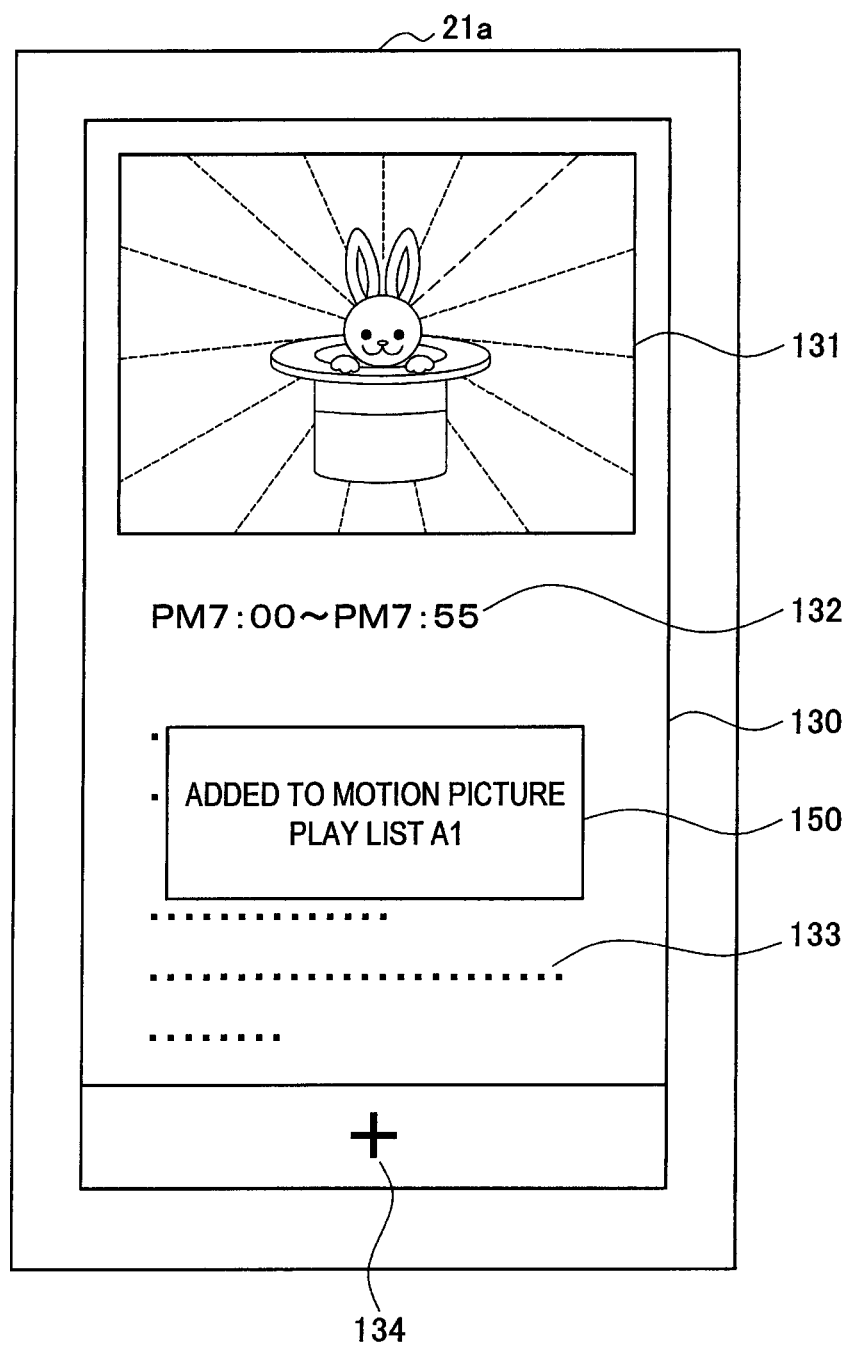
FIG. 12 is an illustration showing an example of an image displayed on the display screen of the communication apparatus.

Then, the live content registration processing section 26 displays a registration completion message on the display area 21a. The registration completion message is a message representing that the live content has been registered in the play list. FIG. 12 illustrates a registration completion message 150 as an example of the registration completion message. Then, the live content registration processing section 26 terminates the registration processing of the live content.

[Archive Content Registration Processing]

Figure 5:
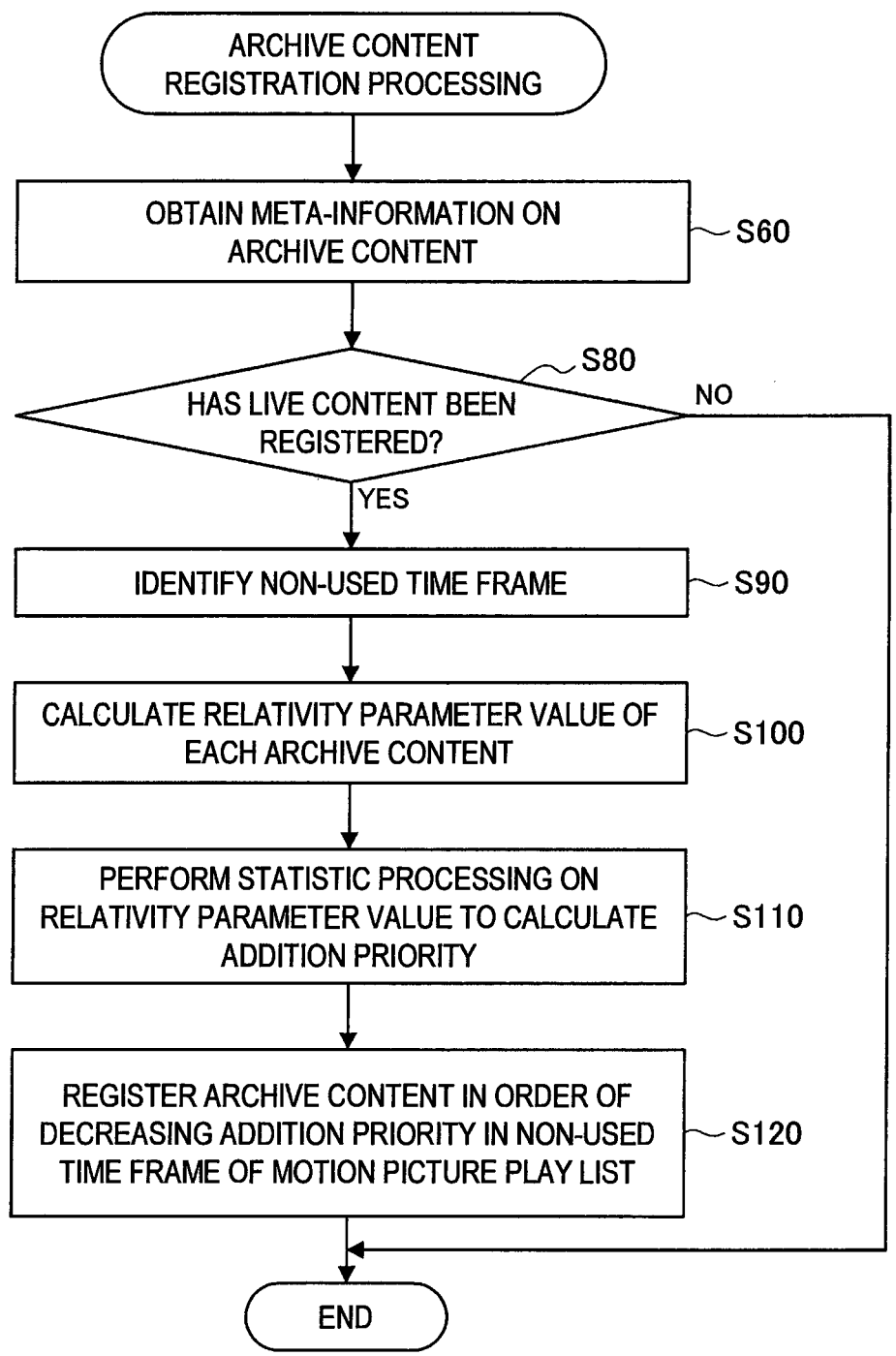
FIG. 5 is a flow chart showing a processing sequence by the information processing system.

Subsequently, referring to FIG. 5, archive content registration processing will be described. In step S60, the communication apparatus 20 picks up an archive content from the server 60. In particular, the content obtaining section 23 of the communication apparatus 20 accesses the server 60 to obtain meta-information on one or each of plural pieces of archive content. The content obtaining section 23 outputs the obtained meta-information to the archive content registration processing section 28. The archive content registration processing section 28 stores the meta-information in the storing section 24.

Here, the archive content as an object to be obtained as the meta-information may be arbitrarily selected by the content obtaining section 23; or the archive content which has an addition priority (described below) greater than a predetermined value may be selected. The archive content as an object to be obtained as the meta-information may be selected by the user. As for the method the user selects the archive content, for example, the following method is available. For example, the content obtaining section 23 accesses the server 60 to obtain a home page in which plural pieces of archive meta-information of the plural pieces of content are displayed in a list. And the archive content registration processing section 28 displays the home page on the display area 21a.

The user makes a reference to the home page displayed on the display area 21a to select desired archive content. For example, the user taps a portion where desired live content is indicated in the home page. The input operation section 22 outputs a piece of operation information corresponding to the tap operation to the archive content registration processing section 28. The archive content registration processing section 28 recognizes the archive content selected by the user based on the operation information, and stores a piece of meta-information corresponding to the recognized archive content to the storing section 24.

In step S80, the archive content registration processing section 28 determines if the live content has been registered in the motion picture play list. When it is determined that the live content has been registered in the motion picture play list, the archive content registration processing section 28 proceeds to step S90; and when it is determined that live content has not been registered in the motion picture play list, the archive content registration processing section 28 terminates the archive content registration processing. The archive content registration processing section 28 performs the processing from step 90 to step S120 below on each live content registered in the motion picture play list.

In step S90, the archive content registration processing section 28 identifies a not-used time frame which is earlier than the live content play time.

In step S100, the archive content registration processing section 28 calculates the relativity parameter value of each archive content based on the archive meta-information of the content stored in the storing section 24.

Here, the relativity parameter is classified into, for example, a title relativity parameter $x_1$, a category relativity parameter $x_2$, a cast relativity parameter $x_3$, an artist relativity parameter $x_4$, a creator relativity parameter $x_5$, an explanation text relativity parameter $x_6$, a user's profile relativity parameter $x_7$, and a usage history parameter $x_8$.

The title relativity parameter $x_1$ is a parameter which represents the relativity between the title of the archive content and the title of the live content. When at least a part of the titles is common to each other, the title relativity parameter $x_1$ results in 1; and when the titles are different from each other, the value results in 0. For example, when live content and archive content are the parts of an identical series of drama, there is a strong possibility that the titles of these content are common to each other.

The category relativity parameter $x_2$ is a parameter which represents the relativity between the category of the archive content and the category of the live content. When the category is common to each other, the category relativity parameter $x_2$ results in 1; and when the category is different from each other, the value results in 0.

The cast relativity parameter $x_3$ is a parameter which represents the relativity between the casts of the archive content and the casts of the live content.

When at least a part of the casts is common to each other, the cast relativity parameter $x_3$ results in 1; and when all of the casts are different from each other, the value results in 0. The cast relativity parameter $x_3$ may get larger in proportion to the number of the common casts.

The artist relativity parameter $x_4$ is a parameter which represents the relativity between the artists of the archive content and the artists of the live content. When at least a part of the artists is common to each other, the artist relativity parameter $x_4$ results in 1; and when all of the artists are different from each other, the value results in 0. The artist relativity parameter $x_4$ may get larger in proportion to the number of the common artists.

The creator relativity parameter $x_5$ is a parameter which represents the relativity between the creators (author, director and staff) of the archive content and the creators of the live content. When at least a part of the creators is common to each other, the creator relativity parameter $x_5$ results in 1; and when all of the creators are different from each other, the value results in 0. The creator relativity parameter $x_5$ may get larger in proportion to the number of the common creators.

The explanation text relativity parameter $x_6$ is a parameter which represents the relativity between the explanation text content of the archive content and the explanation text content of the live content. When at least a part of key words in the explanation texts is common to each other, the explanation text relativity parameter x6 results in 1; and when all of the key words in the explanation text are different from each other, the value results in 0. The explanation text relativity parameter x6 may get larger in proportion to the number of common key words. The archive content registration processing section 28 performs morphological analysis and the like on the explanation text content, to extract various kinds of key words from the explanation text content to calculate the explanation text relativity parameter x6 based on the extracted key words.

The user's profile relativity parameter x7 is a parameter which represents the relativity between the user's profile of the archive content and the user's profile of the live content. When at least a part of the user's profile is common to each other, the user's profile relativity parameter x7 results in 1; and when all of the user's profiles are different from each other, the value results in 0. The user's profile relativity parameter x7 may get larger in proportion to the number of common items in all items of the user's profiles.

The usage history parameter x8 is a parameter which represents if the user of the communication apparatus 20 has used the archive content. When the user has used the archive content, the usage history parameter x8 results in 1; and when the user has not used the archive content, the value results in 0.

In step S110, the archive content registration processing section 28 performs statistic processing on the relativity parameters to calculate the addition priority "y". The addition priority "y" is expressed by a formula (1) below. When the reproduction time of the archive content is longer than the not-used time frame, the archive content registration processing section 28 sets the addition priority "y" to 0.

$$y = k1 \times x1 + k2 \times x2 + k3 \times x3 + k4 \times x4 + k5 \times x5 + k6 \times x6 + k7 \times x7 - k8 \times x8 \ldots \quad (1)$$

where, each of k1 to k8 is a weight coefficient of a real number greater than 0.

In Formula (1), the parameters x1 to x7 are parameters for increasing the addition priority; and the usage history parameter x8 is a parameter for lowering the addition priority. The weight coefficients k1 to k8 are parameters for adjusting the weight of the parameters x1 to x8. That is, the archive content registration processing section 28 adjusts the weight of the parameters x1 to x8 by adjusting the weight coefficients k1 to k8. For example, to add a weight to the title relativity parameter x1 larger than a weight to the parameters x2 to x8, the archive content registration processing section 28 increases the weight coefficient k1 to be larger than the weight coefficients k2 to k8.

In step S120, the archive content registration processing section 28 registers archive content in the not-used time frame of the motion picture play list from archive content which has a higher addition priority. In particular, the archive content registration processing section 28 determines archive content which has the highest addition priority as the content to be stored, and determines the time to start playing the live content as the termination time of the not-used time frame.

The archive content registration processing section 28 determines the clock time at which the time up to the termination time of the not-used time frame is shorter than a period of a predetermined interval time (for example, 10 minutes) as the play termination time of the content as the object to be stored. The archive content registration processing section 28 determines the clock time as the play start time of the content to be stored, which precedes the play termination time of the content by a period of time for reproducing the same. With this, the archive content registration processing section 28 determines the play time of the content to be stored. And the archive content registration processing section 28 generates a piece of registration information (refer to FIG. 9) on the content to be stored and stores the same in the motion picture play list.

After that, the archive content registration processing section 28 determines archive content which has the highest addition priority from the remaining archive content as the content to be stored, and determines the play start time of the registered archive content as the termination time of the not-used time frame. The archive content registration processing section 28 repeats the same processing as above-described processing until the not-used time frame is shorter than a predetermined storing termination time (for example, 5 minutes), or until any archive content registrable to the not-used time frame is not found in the storing section 24. After that, the archive content registration processing section 28 terminates the archive content registration processing. With this, the user is allowed to visually recognize archive content which has a high relativity with the live content as the time to start playing the live content approaches.

[Content Play Processing]

Figure 6:
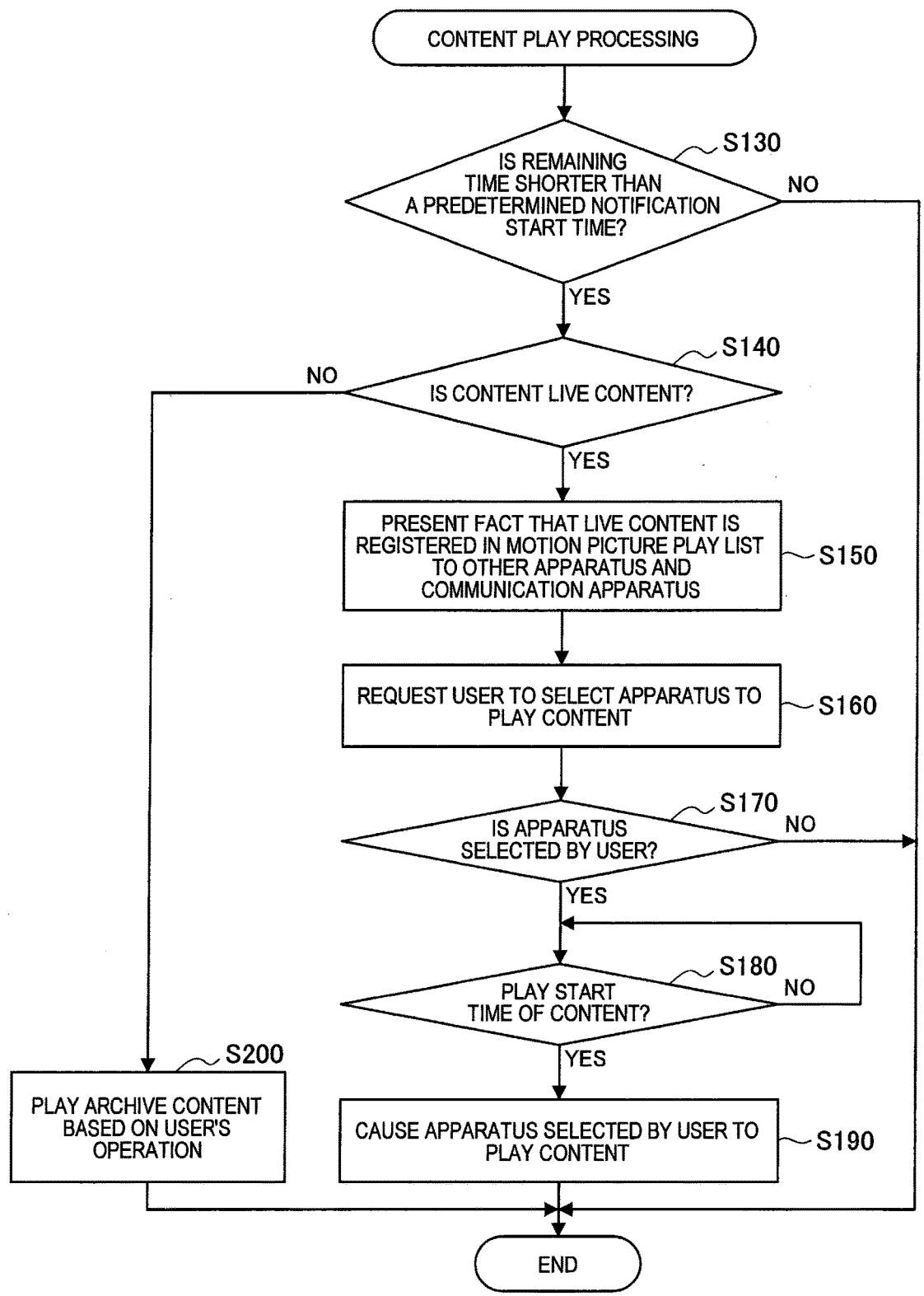
FIG. 6 is a flow chart showing a processing sequence by the information processing system.

Referring to FIG. 6, the content play processing will be described below. In step S130, the notification control section 29 determines if a condition is satisfied; i.e. the remaining time from current time to the closest content (the content after the current time; and the play start time comes first) is shorter than a predetermined notification start time (for example, 10 minutes). When it is determined the condition is satisfied, the notification control section 29 proceeds to step S140; and when it is determined that the condition is not satisfied, the notification control section 29 terminates the content play processing.

In step S140, the notification control section 29 determines if the closest content is live content. When it is determined the closest content is a live content, the notification control section 29 proceeds to step S150; and when it is determined the closest content is archive content, the notification control section 29 proceeds to step S200.

In step S150, the content obtaining section 23 identifies an apparatus which is capable of wireless communication from the two presentation control apparatuses 30 and the PC 50; that is, an apparatus capable of wireless communication. The apparatus capable of wireless communication is, for example, an apparatus the power of which is turned ON, and which is within a wireless communication range of the content obtaining section 23. The content obtaining section 23 generates a piece of wireless communication information on the apparatus capable of wireless communication, and outputs the same to the notification control section 29.

Figure 13:
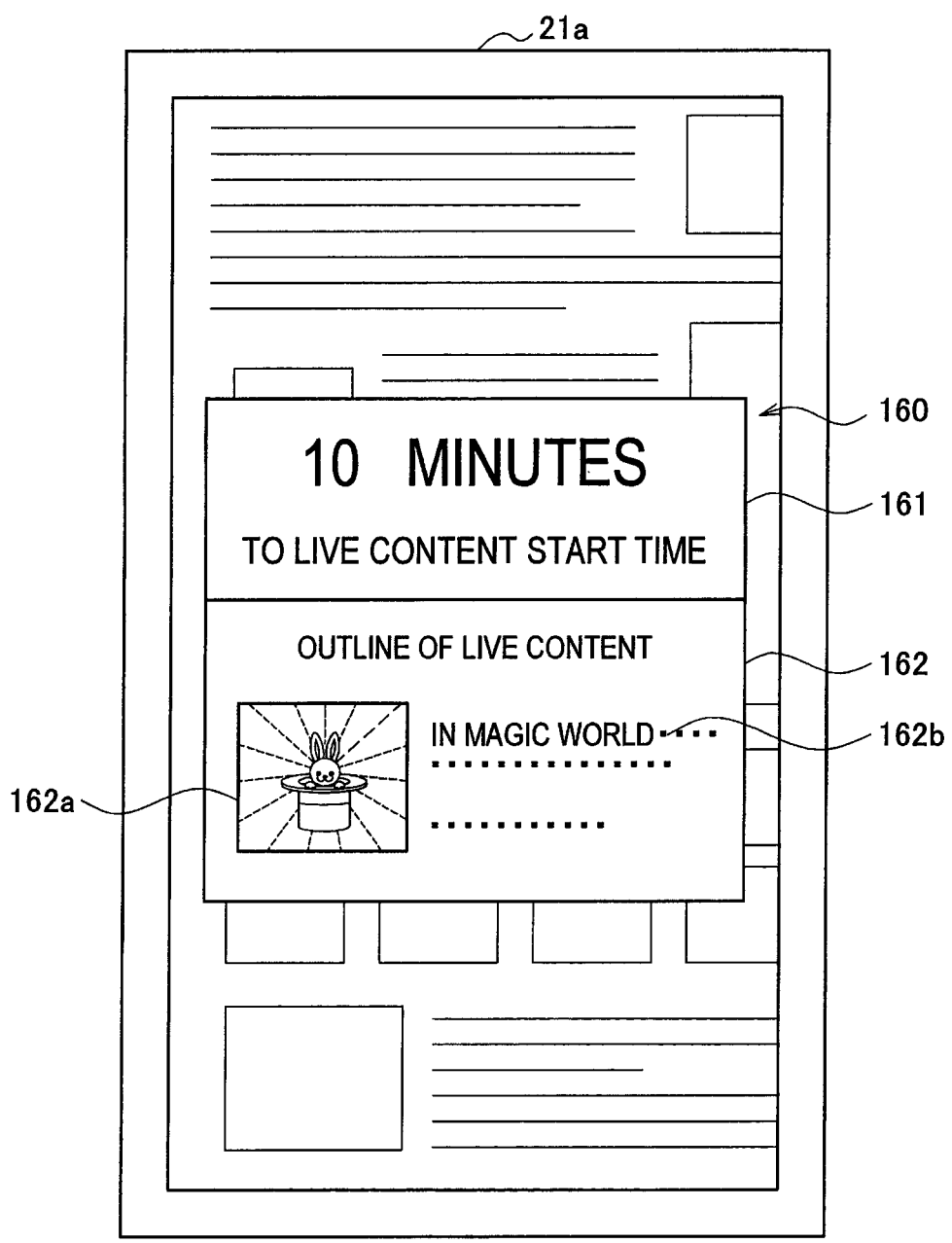
FIG. 13 is an illustration showing an example of an image displayed on the display screen of the communication apparatus.

The notification control section 29 presents a fact that the live content is registered in the motion picture play list to the communication apparatus 20 and the apparatus capable of wireless communication. In particular, the notification control section 29 generates, for example, a notification image 160 shown in FIG. 13. The notification image 160 includes a piece of remaining time information 161 indicating remaining time and a piece of live content outline information 162 explaining an outline of the live content. The live content outline information 162 includes a thumbnail 162a of the live content and an explanation text content 162b explaining an outline of the live content. The notification control section 29 displays the notification image 160 on the display area 21a.

Figure 14:
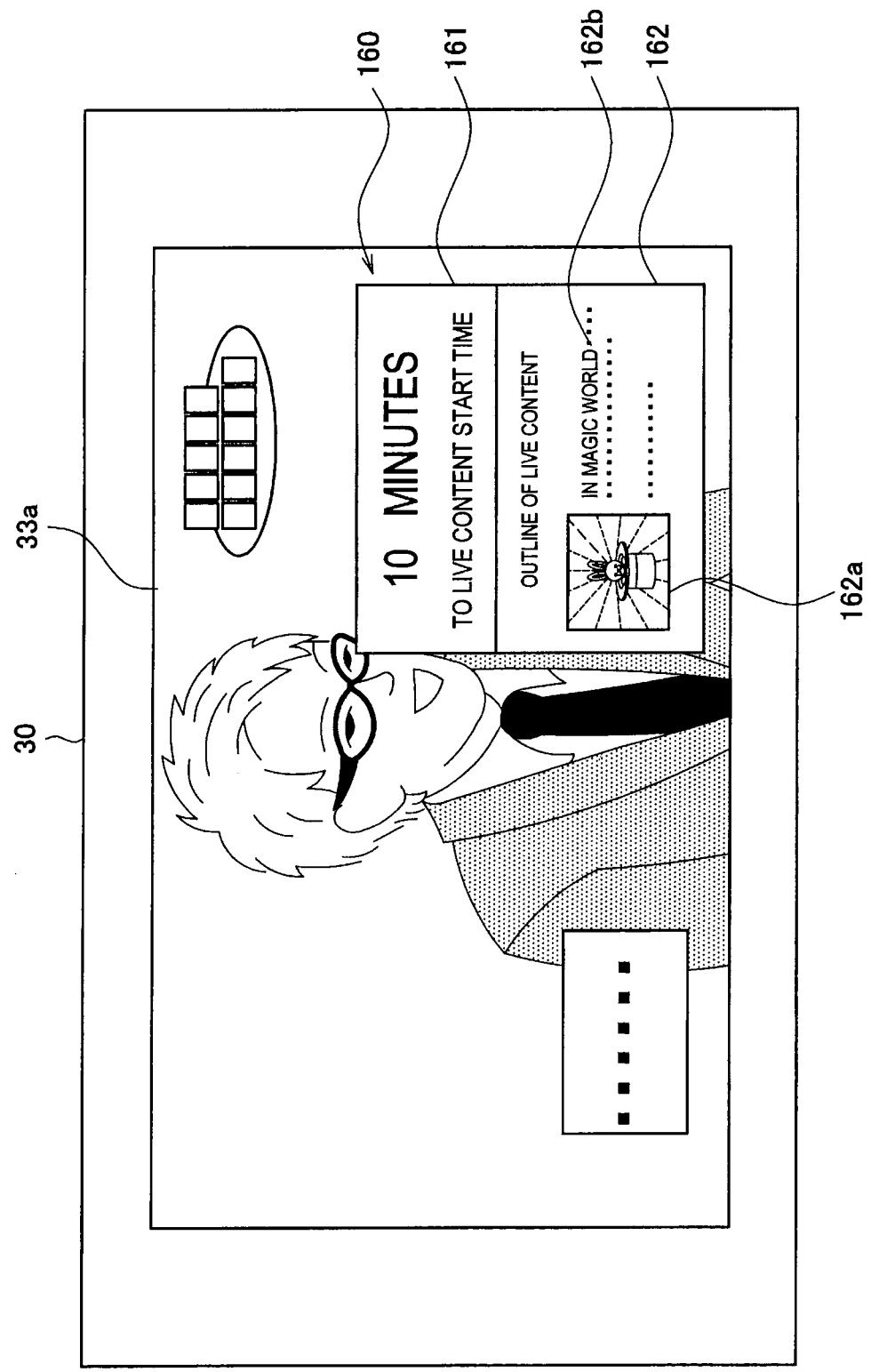
FIG. 14 is an illustration showing an example of an image displayed on the display screen of a presentation control apparatus.

When an apparatus capable of wireless communication is found, the notification control section 29 outputs the notification image 160 to the content obtaining section 23, and the content obtaining section 23 transmits the notification image 160 to the apparatus capable of wireless communication. The apparatus capable of wireless communication displays the notification image 160. For example, when the apparatus capable of wireless communication is the presentation control apparatus 30, the presentation control apparatus 30 displays the notification image 160 on the display area 33*a* as shown in FIG. 14. The presentation control apparatus 30 displays the notification image 160 in a corner of the display area 33*a* so as not to prevent the user from viewing the display area 33*a*. Needless to say, the presentation control apparatus 30 may display the notification image 160 in another position. Likewise, when the apparatus capable of wireless communication is the PC 50, the PC 50 displays the notification image 160 on the display area 51. With this, the notification control section 29 presents a fact that the live content is being registered in the motion picture play list to the communication apparatus 20 and the apparatus capable of wireless communication. That is, the notification control section 29 issues an alert to the user.

The notification control section 29 may be configured to generate a piece of sound information including a piece of information equivalent to the notification image 160, and to output a piece of sound information to the communication apparatus 20 and the apparatus capable of wireless communication.

Figure 15:
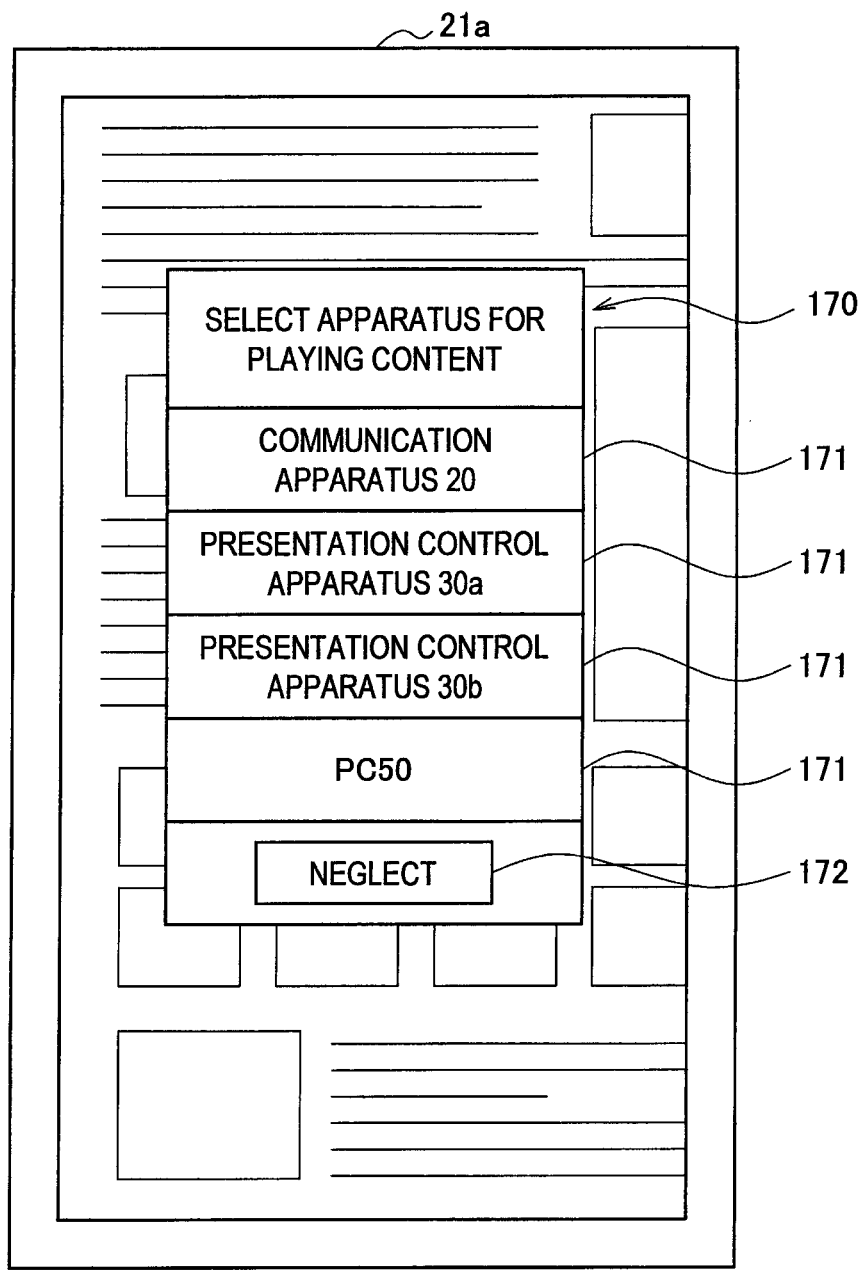
FIG. 15 is an illustration showing an example of an image displayed on the display screen of the communication apparatus.

In step S160, the notification control section 29 prompts the user to select an apparatus which plays the live content. In particular, the notification control section 29 generates, for example, a play apparatus selection image 170 in which the communication apparatus 20 and the apparatus capable of wireless communication are indicated in a list as shown in FIG. 15. The notification control section 29 displays the play apparatus selection image 170 on the display area 21*a*.

The play apparatus selection image 170 includes a plurality of item selection buttons 171 and a neglect button 172. The item selection button 171 is a button for allowing the user to select an apparatus which plays the live content. The item selection button 171 displays names of the communication apparatus 20 or the apparatuses capable of wireless communication. In an example shown in FIG. 15, two presentation control apparatuses 30 (presentation control apparatuses 30*a* and 30*b*) and the PC 50 are the apparatuses capable of wireless communication. The neglect button 172 is a button for allowing the user to neglect the live content.

In step S170, the notification control section 29 determines which apparatus is selected by the user based on the operation information given from the input operation section 22. When it is determined the user has selected one of the apparatuses, the notification control section 29 proceeds to step S180; and when it is determined the user has not selected any of the apparatuses; that is, the neglect button 172 is tapped, the notification control section 29 terminates the content play processing.

On the other hand, the user selects an apparatus which plays the live content by tapping any of the item selection buttons 171. Also, when neglecting the live content, the user taps the neglect button 172. The input operation section 22 outputs a piece of operation information corresponding to the tap operation to the notification control section 29.

Figure 16:
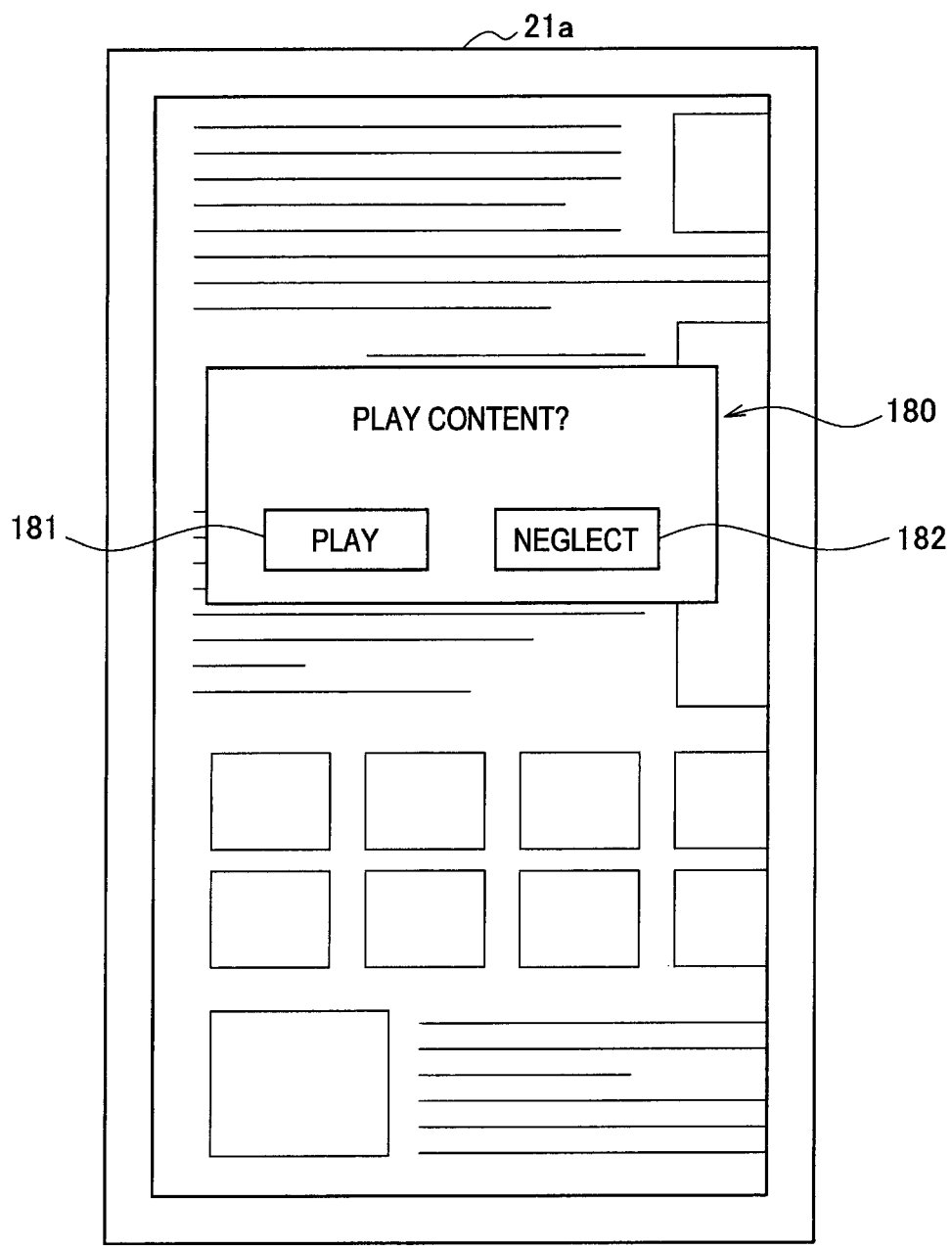
FIG. 16 is an illustration showing an example of an image displayed on the display screen of the communication apparatus.

When no apparatus capable of wireless communication is found, in step S160, the notification control section 29 may display a play/neglect selection image 180 shown in FIG. 16 on the display area 21*a* in place of the above-described play apparatus selection image 170. The play/neglect selection image 180 is an image for allowing the user to select whether or not the communication apparatus 20 plays the live content. The play/neglect selection image 180 includes a play button 181 and a neglect button 182. In step S170, the notification control section 29 determines the button tapped by the user. When it is determined the user has tapped the play button 181, the notification control section 29 proceeds to step S180; and when the user has tapped the neglect button 182, the notification control section 29 terminates the content play processing.

In step S180, the control section 25 waits for the time to start playing the live content. In step S190, the control section 25 presents the live content on the apparatus selected by the user.

Figure 17:
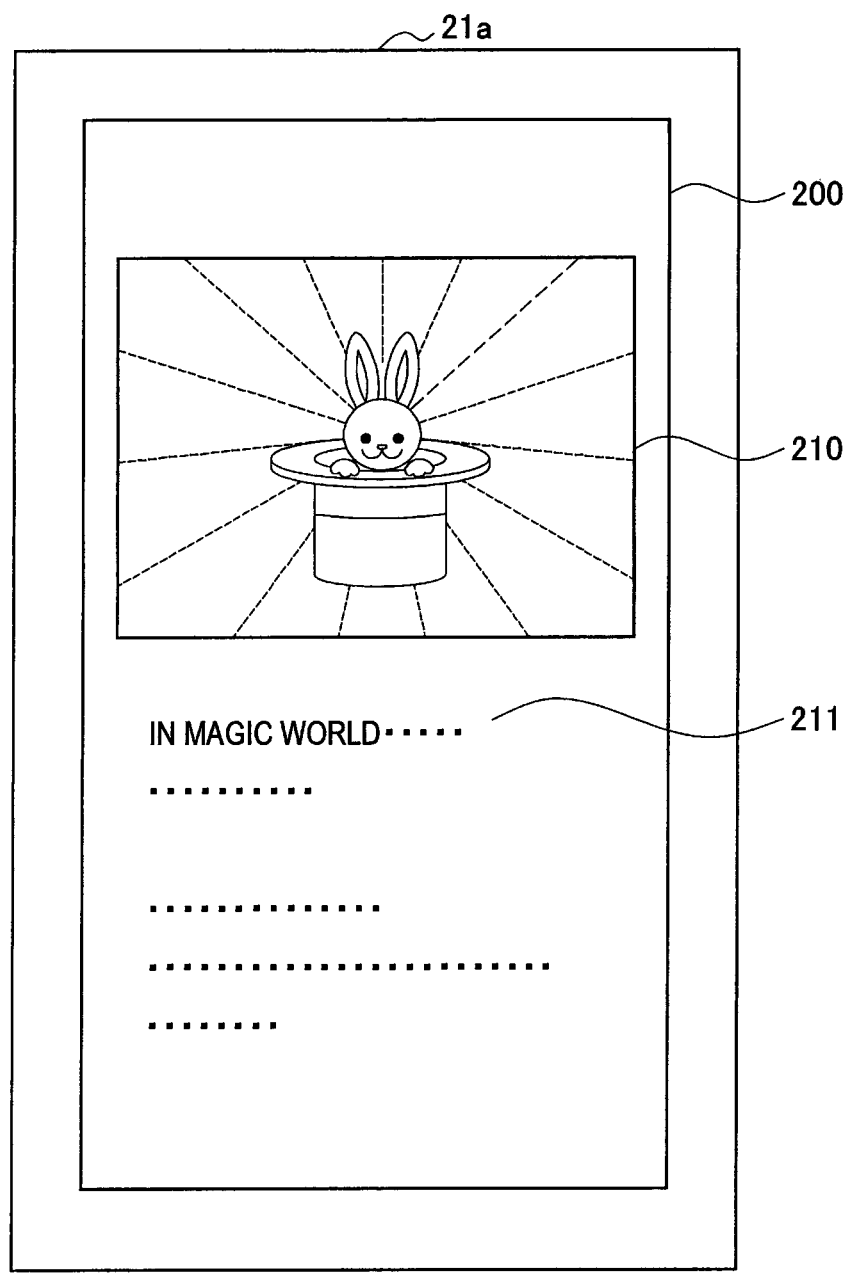
FIG. 17 is an illustration showing an example of an image displayed on the display screen of the communication apparatus.

In particular, when the user selects the communication apparatus 20, the control section 25 generates a piece of content obtaining request information including the meta-information of the live content, and outputs the same to the content obtaining section 23. The content obtaining section 23 obtains the live content from the server 60 based on the content obtaining request information, and outputs the same to the control section 25. The control section 25 displays the live content on the display area 21*a*. FIG. 17 illustrates an example of the display. In this example, the control section 25 displays a live content display image 200 on the display area 21*a*. The live content display image 200 includes a live content 210 and a piece of explanation text content 211 explaining an outline of the live content.

Figure 18:
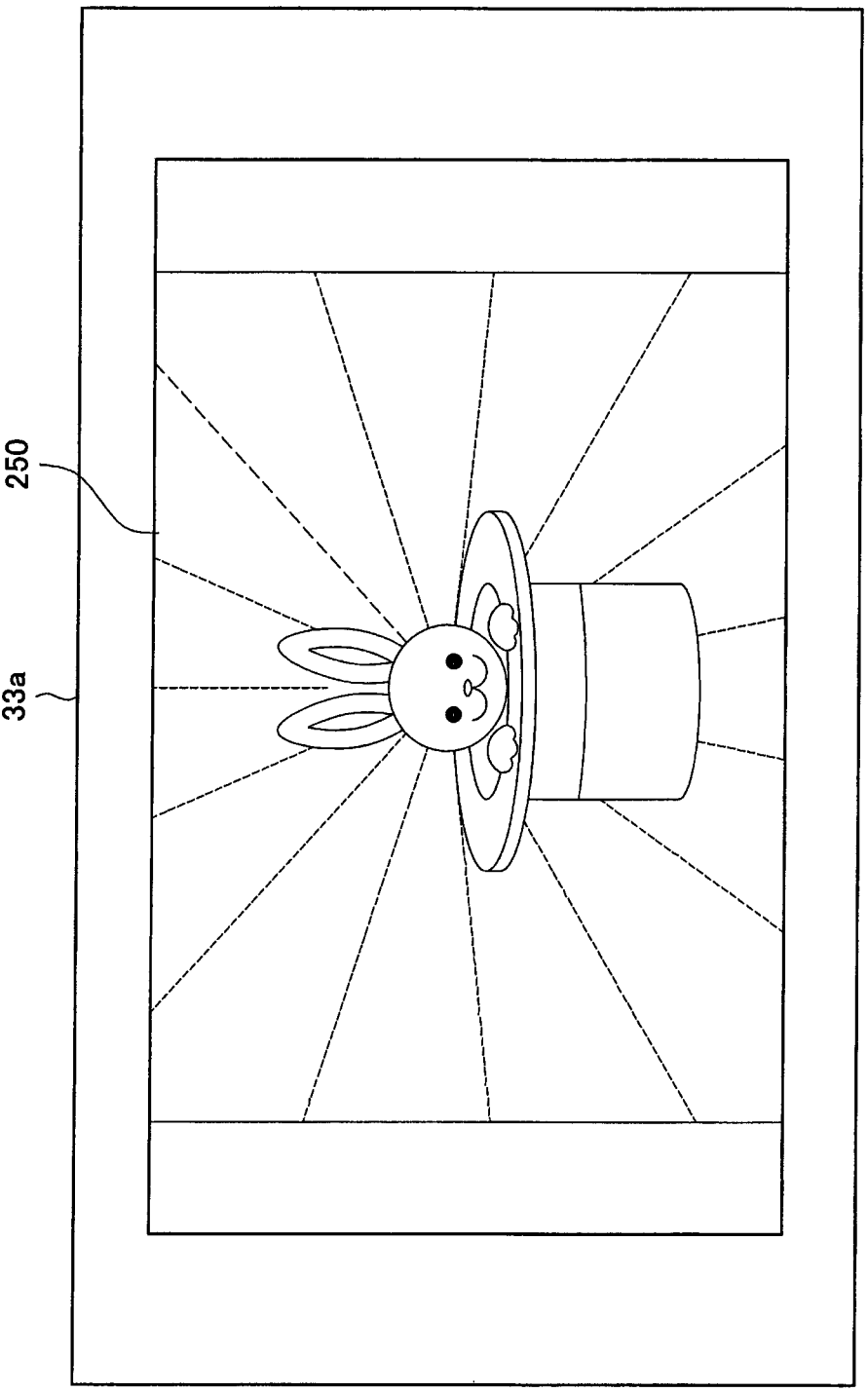
FIG. 18 is an illustration showing an example of an image displayed on the display screen of the presentation control apparatus.

On the other hand, when the user selects an apparatus capable of wireless communication, the control section 25 outputs a piece of content obtaining request information to the content obtaining section 23. The content obtaining section 23 transmits the content obtaining request information to the apparatus capable of wireless communication. The apparatus capable of wireless communication obtains the live content from the server 60 based on the content obtaining request information, and displays the obtained live content. For example, when the user selects the presentation control apparatus 30*a* (or 30*b*) as the apparatus capable of wireless communication, the presentation control apparatus 30*a* (or 30*b*) obtains the live content from the server 60, and displays the live content on the display area 33*a*. FIG. 18 illustrates an example of the display. In this example, live content 250 is displayed on the display area 33*a*. Likewise, when the user selects the PC 50 as the apparatus capable of wireless communication, the PC 50 obtains the live content from the server 60 and displays the live content on the display area 51. After that, the communication apparatus 20 terminates the content play processing.

On the other hand, in step S200, the control section 25 displays archive content which is presently playable on the display area 21*a* based on the user's operation. For example, when the user taps the play button 126 in a state the motion picture play list 120 shown in FIG. 9 is displayed on the display area 21*a*, the control section 25 displays archive content which is presently playable on the display area 21*a*. After that, the control section 25 terminates the content display processing.

The method to play the live content and the archive content is not limited to the above. For example, when the user taps the play button 126, the control section 25 displays the content registered in the motion picture play list on the display area 21*a* in order from the content closest to the current time. When the user taps the registered information 121 corresponding to archive content from the plural pieces of registered information 121, the control section 25 displays the archive content on the display area 21*a*. Further, the control section 25 outputs the motion picture play list on the content obtaining section 23, and the content obtaining section 23 transmits the motion picture play list to the apparatus capable of wireless communication. And the apparatus capable of wireless communication displays the content registered in the motion picture play list on the display area from the content closest to the current time.

As described above, since the information processing system 10 registers archive content in a time frame earlier than the live content play time, the archive content can be presented to the user before playing the live content. With this, since the information processing system 10 prompts the user to the fact that the live content is being registered, the user is reliably recommended to use the live content.

Also, the information processing system 10 can set a period of time between the archive content play time and the live content play time to be shorter than a period of interval time. That is, the information processing system 10 can set the time between the archive content play time and the live content play time to be shorter. With this, the information processing system 10 reduces the possibility that the user may forget the live content after using the archive content.

Further, when the current time is earlier than the time to start playing the live content, the information processing system 10 notifies the user the fact that the live content is being registered in the motion picture play list. Therefore, the information processing system 10 strongly prompts the user to the fact that the live content is being registered.

Moreover, the information processing system 10 strongly prompts the user to the fact that the live content is being registered by notifying the remaining time from the current time to the time to start playing the live content.

Moreover, when the remaining time gets within a predetermined period up to the notification start time, the information processing system 10 notifies the remaining time. Therefore, the information processing system 10 is prevented from providing excessive notification to thereby reduce the possibility the user feels irritation to the notification.

Moreover, the information processing system 10 notifies the user the outline of the live content to thereby strongly prompt the user to the fact that the live content is being registered. Further, the information processing system 10 provides the user a chance to determine whether the user uses the live content.

Moreover the information processing system 10 registers archive content in the motion picture play list from the one having a larger addition priority. Therefore, the information processing system 10 presents the user such archive content to thereby strongly prompt the user to the fact that the live content is being registered.

Also, the information processing system 10 calculates the addition priority based on the above-described formula (1) to thereby present the user, for example, archive content the cast and the like of which are common to those of the live content. In the case the live content is one of the series of continued drama, the information processing system 10 can provide the user with another series of the continued drama or a digest of another series of continued drama as archive content. Further, the information processing system 10 can provide the user with archive content other than the archive content which have been used by the user. The information processing system 10 may register archive content which has a large addition priority in the not-used time frame after the live content (preferably, within a predetermined period of time from the play termination time; i.e. immediately after that).

As an application of the information processing system 10, the information processing system 10 may be used in a theater. In this case, assuming a movie which is to be played in the day as live content, the information processing system 10 may deliver archive content concerning a movie which is to be performed next time to the user's communication apparatus 20 before starting the live content. With this, the user can enjoy the archive content before starting the movie.

It should be understood by those skilled in the art that various modifications, combinations, sub-combinations and alterations may occur depending on design requirements and other factors insofar as they are within the scope of the appended claims or the equivalents thereof.

The present technology may also be configured as below.

(1) An information processing apparatus, comprising:
 a live content registration processing section that registers a live content which is preset with play time and the playing time of the live content in a play list while connecting the play time to the live content; and
 an archive content registration processing section that registers an archive content and the play time of the archive content in the play list after determining a period of time earlier than the play time of the live content as the play time of the archive content which is playable at given time.

(2) The information processing apparatus according to (1), wherein the archive content registration processing section determines a point of clock time at which a period of time up to the time to start playing the live content is shorter than a period of a predetermined interval time as the play termination time of the archive content.

(3) The information processing apparatus according to (1) or (2), further including a notification control section that controls, when the current time is earlier than the time to start playing the live content, to notify a fact that the live content is being registered in the play list.

(4) The information processing apparatus according to (3), wherein the notification control section controls to notify the remaining time from the current time up to the time to start playing the live content.

(5) The information processing apparatus according to (4), wherein, when the remaining time gets within a predetermined notification start time, the notification control section controls to notify the remaining time.

(6) The information processing apparatus according to any one of (3) to (5), wherein the notification control section notifies an outline of the live content.

(7) The information processing apparatus according to any one of (1) to (6), further including a content obtaining section that obtains plural pieces of archive content, wherein
 the archive content registration processing section registers the plural pieces of archive content in the play list in order of decreasing addition priority after calculating the addition priority on each of the plural pieces of archive content.

(8) An information processing method, including:
 registering live content which is preset with play time and the playing time of the live content in a play list while connecting the play time to the live content; and
 registering archive content and the play time of the archive content in the play list after determining a period of time earlier than the play time of the live content as the play time of the archive content which is playable at given time.

(9) A program causing a computer to execute:
  a live content registration processing function to register live content which is preset with play time and the playing time of the live content in a play list while connecting the play time to the live content; and
  an archive content registration processing function to register archive content and the play time of the archive content in the play list after determining a period of time earlier than the play time of the live content as the play time of the archive content which is playable at given time.
(10) The program according to (9), wherein the archive content registration processing function determines the clock time at which a period of time up to the time to start playing the live content is shorter than a period of a predetermined interval time as the play termination time of the archive content.
(11) The program according to (9) or (10), further including a notification control function that controls, when the current time is earlier than the time to start playing the live content, to notify a fact that the live content is being registered in the play list.
(12) The program according to (11), wherein the notification control function controls to notify the remaining time from the current time up to the time to start playing the live content.
(13) The program according to (12), wherein, when the remaining time gets within a predetermined notification start time, the notification control function controls to notify the remaining time.
(14) The program according to any one of (11) to (13), wherein the notification control function notifies an outline of the live content.
(15) The program according to any one of (9) to (14), further including:
  a content obtaining function to obtain plural pieces of archive content, wherein
    the archive content registration processing function registers the plural pieces of archive content in the play list in order of decreasing addition priority after calculating the addition priority on each of the plural pieces of archive content.

The present disclosure contains subject matter related to that disclosed in Japanese Priority Patent Application JP 2011-164318 filed in the Japan Patent Office on Jul. 27, 2011, the entire content of which is hereby incorporated by reference.

What is claimed is:

1. An information processing apparatus, comprising:
  at least one processor;
  a live content registration processing section that registers, using the at least one processor, a live content in a play list including the live content and archive content, wherein the live content has a preset play time and playing time of the live content that is registered in the play list that is associated with the live content, wherein the live content is playable at only the preset play time; and
  an archive content registration processing section that registers, using the at least one processor, the archive content in the play list that is associated with the live content at a play time that is determined by the archive content registration processing section to be a period of time earlier than the play time of the registered live content, wherein the archive content has no preset play time and is playable at any time,
  wherein a user is notified, using the at least one processor, of the registering of the live content in the play list to be played at the preset play time as a recommendation to use the live content, and upon receipt of the recommendation, the user is prompted by the at least one processor to determine a selected presentation control apparatus of a plurality of presentation control apparatuses on which to use the live content at the preset play time, and
  wherein the archive content registration processing section determines a point of clock time at which a period of time up to the time to start playing the live content is shorter than a period of a predetermined interval time as the play termination time of the archive content.

2. The information processing apparatus according to claim 1, further including a notification control section that controls, when the current time is earlier than the time to start playing the live content, to notify a fact that the live content is being registered in the play list.

3. The information processing apparatus according to claim 2, wherein the notification control section controls to notify the remaining time from the current time up to the time to start playing the live content.

4. The information processing apparatus according to claim 3, wherein, when the remaining time gets within a predetermined notification start time, the notification control section controls to notify the remaining time.

5. The information processing apparatus according to claim 2, wherein the notification control section notifies an outline of the live content.

6. The information processing apparatus according to claim 1, further including a content obtaining section that obtains plural pieces of archive content, wherein
  the archive content registration processing section registers the plural pieces of archive content in the play list in order of decreasing addition priority after calculating the addition priority on each of the plural pieces of archive content.

7. The information processing apparatus according to claim 1, wherein when it is determined that the live content is not to be used, the at least one processor cancels the registration of the live content.

8. A non-transitory computer-readable medium having embodied thereon a program, which when executed by a processor of a computer causes the processor to execute:
  a live content registration processing function to register live content in a play list including the live content and archive content, wherein the live content has a preset play time and playing time of the live content that is registered in the play list that is associated with the live content, wherein the live content is playable at only the preset play time; and
  an archive content registration processing function to register the archive content in the play list that is associated with the live content at a play time that is determined by the archive content registration processing section to be a period of time earlier than the play time of the registered live content, wherein the archive content has no preset play time and is playable at any time,
  wherein a user is notified, using the at least one processor, of the registering of the live content in the play list to be played at the preset play time as a recommendation to use the live content, and upon receipt of the recommendation, the user is prompted by the at least one processor to determine a selected presentation control apparatus of a plurality of presentation control apparatuses on which to use the live content at the preset play time, and wherein the archive content registration processing section determines a point of clock time at which a period of time up to the time to start playing the live content is shorter than a period of a predetermined interval time as the play termination time of the archive content.

9. The program according to claim 8, further including a notification control function that controls, when the current time is earlier than the time to start playing the live content, to notify a fact that the live content is being registered in the play list.

10. The program according to claim 9, wherein the notification control function controls to notify the remaining time from the current time up to the time to start playing the live content.

11. The program according to claim 10, wherein, when the remaining time gets within a predetermined notification start time, the notification control function controls to notify the remaining time.

12. The program according to claim 9, wherein the notification control function notifies an outline of the live content.

13. The program according to claim 8, further including:
a content obtaining function to obtain plural pieces of archive content, wherein
the archive content registration processing function registers the plural pieces of archive content in the play list in order of decreasing addition priority after calculating the addition priority on each of the plural pieces of archive content.

14. The program according to claim 8, wherein when it is determined that the live content is not to be used, the at least one processor cancels the registration of the live content.

15. An information processing method, including:
registering live content in a play list including the live content and archive content, wherein the live content has a preset play time and playing time of the live content that is registered in the play list that is associated with the live content, wherein the live content is playable at only the preset play time;
registering the archive content in the play list that is associated with the live content at a play time that is determined by the archive content registration processing section to be a period of time earlier than the play time of the registered live content, wherein the archive content has no preset play time and is playable at any time; and
notifying a user of the registering of the live content in the play list to be played at the preset play time as a recommendation to use the live content and prompting the user to determine a selected presentation control apparatus of a plurality of presentation control apparatuses on which to use the live content at the preset play time, and
wherein the archive content registration processing section determines a point of clock time at which a period of time up to the time to start playing the live content is shorter than a period of a predetermined interval time as the play termination time of the archive content.

16. The information processing method according to claim 15, wherein when it is determined that the live content is not to be used, the registration of the live content is cancelled.

* * * * *